(12) United States Patent
Kim et al.

(10) Patent No.: US 12,293,694 B2
(45) Date of Patent: May 6, 2025

(54) DATA TRANSCEIVER SYSTEM, DISPLAY SYSTEM, AND DISPLAY DEVICE

(71) Applicant: Samsung Display Co., Ltd., Yongin-si (KR)

(72) Inventors: Jundal Kim, Asan-si (KR); Hyunsu Kim, Hwaseong-si (KR); Kyungyoul Min, Hwaseong-si (KR); Dong-Won Park, Yongin-si (KR); Chaehee Park, Suwon-si (KR); Jongman Bae, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 177 days.

(21) Appl. No.: 18/096,760

(22) Filed: Jan. 13, 2023

(65) Prior Publication Data

US 2023/0230526 A1  Jul. 20, 2023

(30) Foreign Application Priority Data

Jan. 17, 2022  (KR) .................. 10-2022-0006554

(51) Int. Cl.
*G09G 3/20* (2006.01)
*G06T 11/00* (2006.01)

(52) U.S. Cl.
CPC ............ *G09G 3/2096* (2013.01); *G06T 11/00* (2013.01); *G09G 2310/0286* (2013.01); *G09G 2340/02* (2013.01)

(58) Field of Classification Search
None
See application file for complete search history.

(56) References Cited

U.S. PATENT DOCUMENTS

| | | | |
|---|---|---|---|
| 7,154,905 B2 * | 12/2006 | Shin | H04L 47/10 370/468 |
| 7,518,534 B2 | 4/2009 | Grivna | |
| 2017/0287378 A1 * | 10/2017 | Ando | H04N 19/91 |

* cited by examiner

*Primary Examiner* — Yanna Wu
(74) *Attorney, Agent, or Firm* — CANTOR COLBURN LLP

(57) ABSTRACT

A data transceiver system includes an encoder which generates first encoded data by performing a logical operation based on a random number and image data, and generates second encoded data by inverting the first encoded data every N bits, where N is a positive integer greater than or equal to 2, and a decoder which restores the first encoded data by decoding the second encoded data, and restores the image data by decoding the first encoded data.

19 Claims, 17 Drawing Sheets

DATA TRANSCEIVER SYSTEM, DISPLAY SYSTEM, AND DISPLAY DEVICE

This application claims priority to Korean Patent Application No. 10-2022-0006554, filed on Jan. 17, 2022, and all the benefits accruing therefrom under 35 U.S.C. § 119, the content of which in its entirety is herein incorporated by reference.

BACKGROUND

1. Field

Embodiments of the invention relate to a data transceiver system, a display system, and a display device. More particularly, embodiments of the invention relate to a data transceiver system, a display system, and a display device encoding without overhead data.

2. Description of the Related Art

Generally, a display device may include a display panel, a driving controller, gate driver, and a data driver. The display panel may include a plurality of gate lines, a plurality of data lines, and a plurality of pixels electrically connected to the gate lines and the data lines. The gate driver may provide gate signals to the gate lines. The data driver may provide data voltages to the data lines. The driving controller may control the gate driver and the data driver.

As a performance of a display device, an image sensor, or the like included in a mobile device or the like is improved and a resolution is increased, an amount of image data may be rapidly increasing. Due to the development of the mobile device, the number of internal wire may increase, electromagnetic interference ("EMI") may increase, and data transmission time may vary according to the wire. In order to solve these problems, a data transceiver system employing a serial interface for transmitting the image data between a host processor and a display device or between a driving controller and a data driver is being studied.

SUMMARY

The data transceiver system employing the serial interface may transmit clock embedded data through a single wire without a wire transmitting a clock signal. In the conventional data transceiver system, overhead data may be added to the image data in order to encode the image data to the clock embedded data (i.e., to encode the image data to the clock embedded data by generating an edge in the image data). When the overhead data is added to the image data, a memory device storing the image data may be desired to add the overhead data.

Embodiments of the invention provide a data transceiver system encoding image data by generating an edge to the image data without overhead data.

Embodiments of the invention also provide a display system encoding image data by generating an edge to the image data without overhead data.

In an embodiment of the invention, a data transceiver system may include an encoder which generates first encoded data by performing a logical operation based on a random number and image data, and generates second encoded data by inverting the first encoded data every N bits, where N is a positive integer greater than or equal to 2, and a decoder which restores the first encoded data by decoding the second encoded data, and restores the image data by decoding the first encoded data.

In an embodiment, the encoder may include a linear feedback shift register which generates the random number.

In an embodiment, the encoder may generate the first encoded data by selectively performing a first logical operation or a second logical operation different from the first logical operation.

In an embodiment, the encoder may generate a (M+1)-th bit, where M is a positive integer, of the first encoded data by performing the first logical operation when a M-th bit of the second encoded data is a same as a value generated by performing the first logical operation based on the random number and the image data, and generate the (M+1)-th bit of the first encoded data by performing the second logical operation when the M-th bit of the second encoded data is a same as a value generated by performing the second logical operation based on the random number and the image data.

In an embodiment, the encoder may generate from a (K+2)-th bit, where K is a multiple of N, of the first encoded data to a (K+N+1)-th bit of the first encoded data by performing the first logical operation when a (K+1)-th bit of the second encoded data is a same as a value generated by performing the first logical operation based on the random number and the image data, and generate from the (K+2)-th bit of the first encoded data to the (K+N+1)-th bit of the first encoded data by performing the second logical operation when the (K+1)-th bit of the second encoded data is a same as a value generated by performing the second logical operation based on the random number and the image data.

In an embodiment, the encoder may include a first XOR operation circuit which performs the first logical operation, a first XNOR operation circuit which performs the second logical operation, a first selector which determines the logical operation to be performed and outputs a first operation selection signal, and a first multiplexer including a first input terminal connected to the first XOR operation circuit, a second input terminal connected to the first XNOR operation circuit, a control terminal which receives the first operation selection signal, and an output terminal which outputs the first encoded data, the first logical operation may be a XOR logical operation, and the second logical operation may be a XNOR logical operation.

In an embodiment, the encoder may invert a K-th bit, where K is a multiple of N, of the first encoded data, a K-th bit of the second encoded data may be a same as the K-th bit of the first encoded data, and a (K+1)-th bit of the second encoded data may be a same as a bit generated by inverting the K-th bit of the first encoded data.

In an embodiment, the encoder may include a first delayer which delays the first encoded data by 1 bit, a first inverter which inverts the first encoded data delayed by the first delayer, and a second multiplexer including a first input terminal connected to the first inverter, a second input terminal which receives the first encoded data, a control terminal which receives a first inversion selection signal, and an output terminal which outputs the second encoded data.

In an embodiment, the encoder may generate the first encoded data by selectively performing a first logical operation or a second logical operation different from the first logical operation, and generate third encoded data by inverting the second encoded data when the performed logical operation is converted, and the decoder may restore the second encoded data by decoding the third encoded data.

In an embodiment, the encoder may generate from a (K+2)-th bit, where K is a multiple of N, of the first encoded data to the (K+N+1)-th bit of the first encoded data by performing the first logical operation when a (K+1)-th bit of the second encoded data is a same as a value generated by performing the first logical operation based on the random number and the image data, generate from the (K+2)-th bit of the first encoded data to the (K+N+1)-th bit of the first encoded data by performing the second logical operation when the (K+1)-th bit of the second encoded data is a same as a value generated by performing the second logical operation based on the random number and the image data, generate the third encoded data by inverting the (K+1)-th bit of the second encoded data when a K-th bit of the first encoded data is generated by the first logical operation and the (K+1)-th bit of the second encoded data is a same as a value generated by performing the second logical operation based on the random number and the image data, and generate the third encoded data by inverting the (K+1)-th bit of the second encoded data when the K-th bit of the first encoded data is generated by the second logical operation and the (K+1)-th bit of the second encoded data is a same as a value generated by performing the first logical operation based on the random number and the image data In an embodiment, the encoder may include a second inverter which inverts the second encoded data, a first selector which determines whether the logical operation is converted and output a first conversion selection signal, and a third multiplexer including a first input terminal connected to the second inverter, a second input terminal which receives the second encoded data, a control terminal which receives the first conversion selection signal, and an output terminal which outputs the third encoded data.

In an embodiment, the encoder may generate fourth encoded data by inverting a (K+1)-th bit, where K is a multiple of N, of the third encoded data when the third encoded data has a same value from a (K-N+1)-th bit to a K-th bit, and the decoder may restore the third encoded data by decoding the fourth encoded data.

In an embodiment, the encoder may include a third inverter which inverts the third encoded data, a first continuous selection signal generator which determines whether the third encoded data has a same value from the (K-N+1)-th bit to the K-th bit and outputs a first continuous selection signal, and a fourth multiplexer including a first input terminal connected to the third inverter, a second input terminal which receives the third encoded data, a control terminal which receives the first continuous selection signal, and an output terminal which outputs the fourth encoded data.

In an embodiment of the invention, a display system may include a host processor including a encoder which generates first encoded data by performing a logical operation based on a random number and image data, and generates second encoded data by inverting the first encoded data every N bits, where N is a positive integer greater than or equal to 2, and a display device including a decoder which restores the first encoded data by decoding the second encoded data, and restores the image data by decoding the first encoded data, and which displays an image based on the image data.

In an embodiment, the encoder may generate the first encoded data by selectively performing a first logical operation or a second logical operation different from the first logical operation, and generate third encoded data by inverting the second encoded data when the performed logical operation is converted, and the decoder may restore the second encoded data by decoding the third encoded data.

In an embodiment, the encoder may generate fourth encoded data by inverting a (K+1)-th bit, where K is a multiple of N, of the third encoded data when the third encoded data has a same value from a (K−N+1)-th bit to a K-th bit, and the decoder may restore the third encoded data by decoding the fourth encoded data.

In an embodiment of the invention, a display device may include a display panel including pixels, a driving controller including an encoder which generates first encoded data by performing a logical operation based on a random number and image data, and generates second encoded data by inverting the first encoded data every N bits, where N is a positive integer greater than or equal to 2, and which controls a data driver, and a data driver including a decoder which restores the first encoded data by decoding the second encoded data, and restores the image data by decoding the first encoded data, and which provides data voltages to the pixels.

In an embodiment, the encoder may generate third encoded data by inverting the second encoded data when the performed logical operation is converted, and the decoder may restore the second encoded data by decoding the third encoded data.

In an embodiment, the encoder may generate fourth encoded data by inverting a (K+1)-th bit, where K is a multiple of N, of the third encoded data when the third encoded data has a same value from a (K−N+1)-th bit to a K-th bit, and the decoder may restore the third encoded data by decoding the fourth encoded data.

In an embodiment, the encoder may output a clock training signal when an active period starts, and output the fourth encoded data in the active period, and may not output the fourth encoded data in a blank period.

Therefore, the data transceiver system may generate an edge to encode image data without overhead data by generating first encoded data by performing a logical operation based on a random number and image data, and generating second encoded data by inverting the first encoded data every N bits, where N is a positive integer greater than or equal to 2.

In addition, the display system may encode image data without a memory device by encoding the image data by generating an edge to the image data without overhead data. Accordingly, latency of encoding may be reduced, a simplified design of an encoder may be possible, and power consumption of the display system may be reduced.

Further, the display device may encode image data without a memory device by encoding the image data by generating an edge to the image data without overhead data. Accordingly, latency of encoding may be reduced, a simplified design of an encoder may be possible, and power consumption of the display device may be reduced.

However, the effects of the invention are not limited to the above-described effects, and may be variously expanded without departing from the spirit and scope of the invention.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which:

FIG. 3 is a table illustrating an embodiment in which the data transceiver system of FIG. 1 encodes.

FIG. 9 is a table illustrating an embodiment in which the data transceiver system of FIG. 1 decodes.

DETAILED DESCRIPTION

Figure 1:
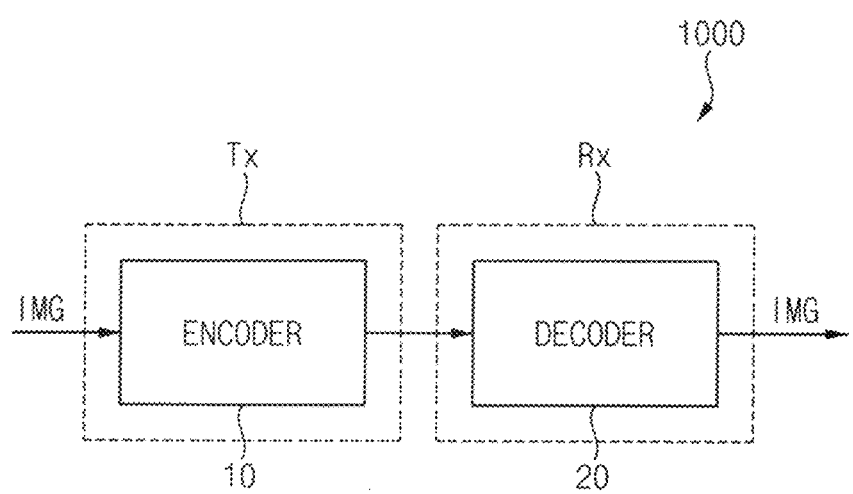
FIG. 1 is a block diagram illustrating an embodiment of a data transceiver system according to the invention.

Hereinafter, the invention will be explained in detail with reference to the accompanying drawings.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

FIG. 1 is a block diagram illustrating an embodiment of a data transceiver system 1000 according to the invention.

Referring to FIG. 1, the data transceiver system 1000 may include a transmitter Tx and a receiver Rx. The transmitter Tx may include an encoder 10 encoding image data IMG, and the receiver Rx may include a decoder 20 decoding the encoded data to restore the image data IMG. The data transceiver system 1000 may transmit the image data IMG from the transmitter Tx to the receiver Rx through one lane (i.e., using a serial interface).

Figure 2:
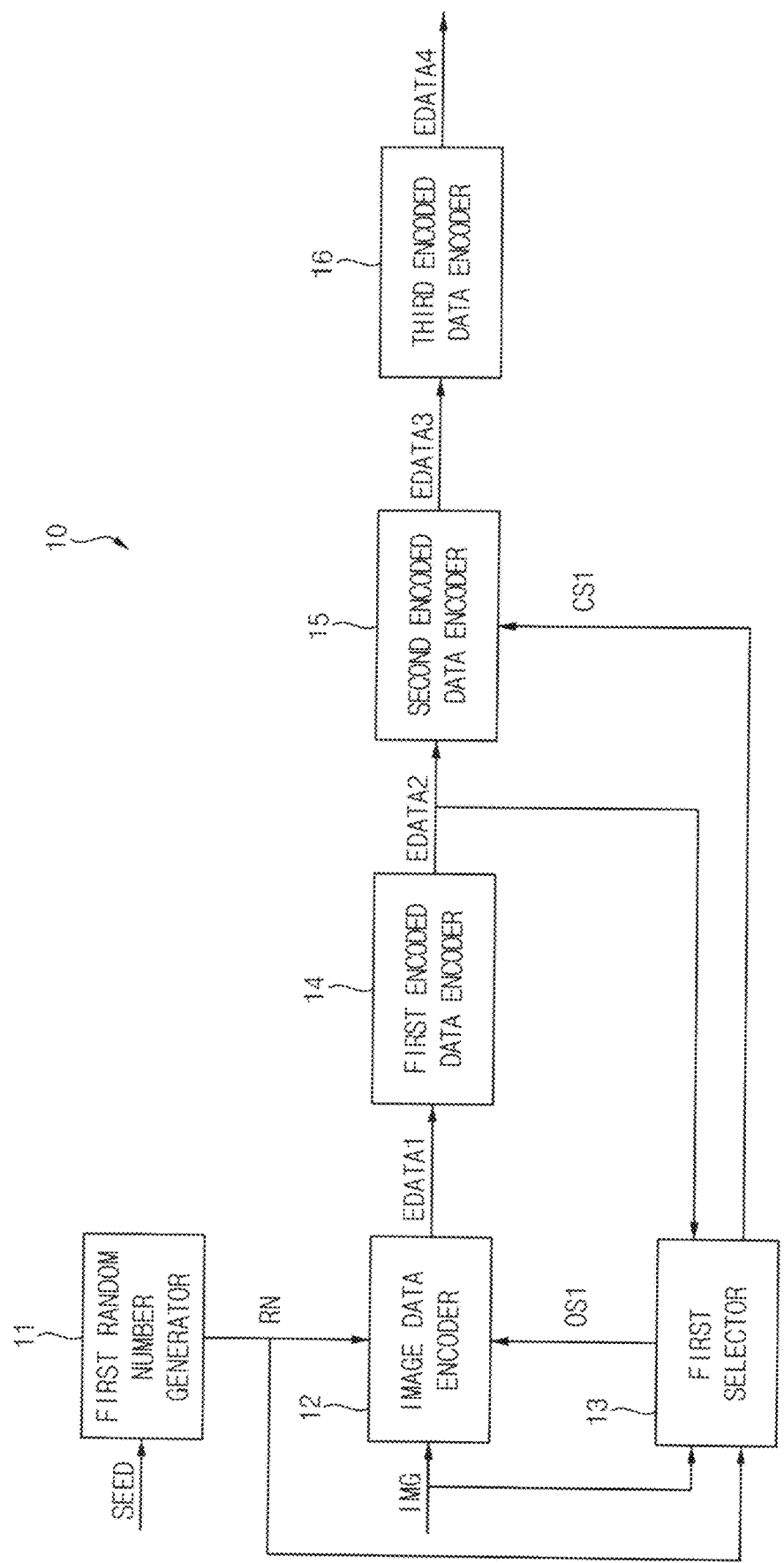
FIG. 2 is a block diagram illustrating an embodiment of an encoder of the data transceiver system of FIG. 1.

FIG. 2 is a block diagram illustrating an embodiment of an encoder 10 of the data transceiver system 1000 of FIG. 1.

Referring to FIG. 2, the encoder 10 may generate first encoded data EDATA1 by performing a logical operation based on a random number RN and the image data IMG, and generate second encoded data EDATA2 by inverting the first encoded data EDATA1 every N bits, where N is a positive integer greater than or equal to 2. In an embodiment, the encoder may generate the first encoded data EDATA1 by selectively performing a first logical operation or a second logical operation different from the first logical operation, and generate third encoded data EDATA3 by inverting the second encoded data EDATA2 when the performed logical operation is converted. The encoder 10 may generate fourth encoded data EDATA4 by inverting a (K+1)-th bit, where K is a multiple of N, of the third encoded data EDATA3 when the third encoded data EDATA3 has the same value from the (K−N+1)-th bit to the K-th bit. That is, the encoder 10 may encode the image data IMG to the first encoded data EDATA1, encode the first encoded data EDATA1 to the second encoded data EDATA2, encode the second encoded data EDATA2 to the third encoded data EDATA3, and encode the third encoded data EDATA3 to the fourth encoded data EDATA4.

The encoder 10 may include a first random number generator 11, an image data encoder 12, a first selector 13, a first encoded data encoder 14, a second encoded data encoder 15, and a third encoded data encoder 16. A detailed description thereof will be given later.

Figure 3:
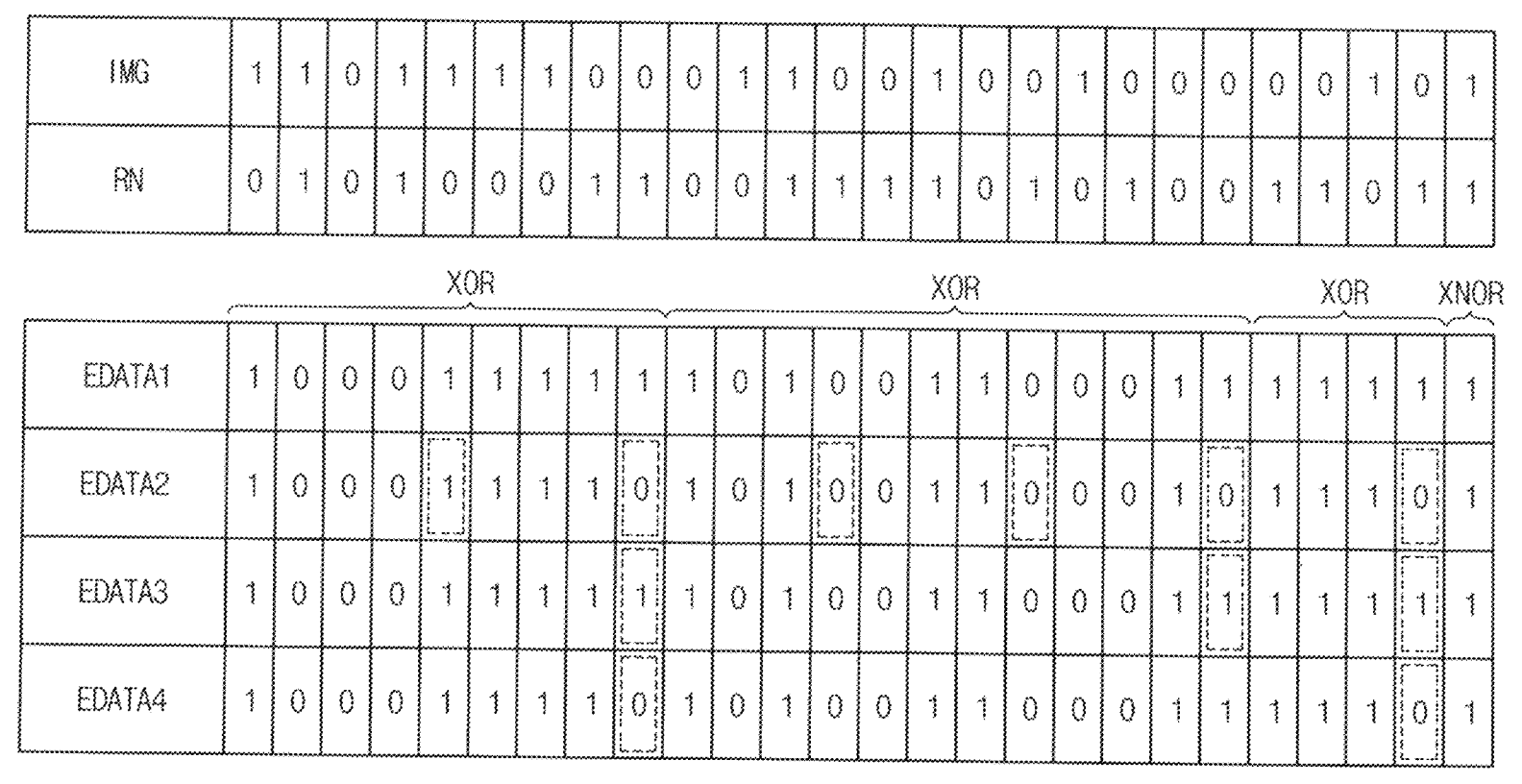
Figure 4:
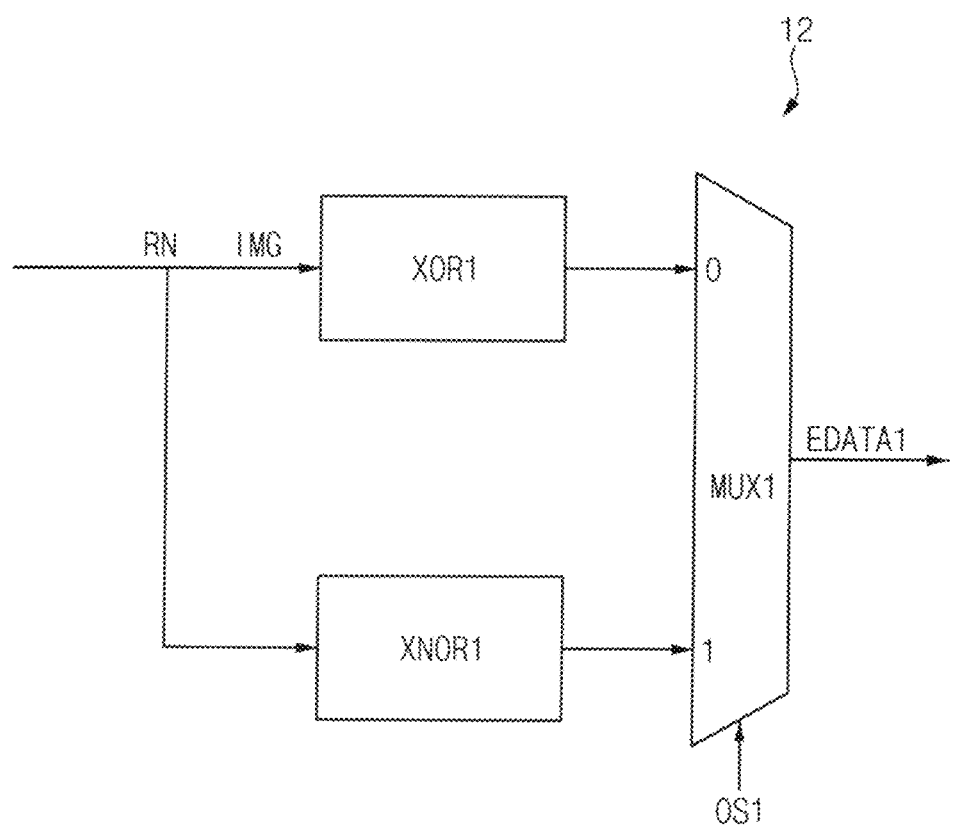
FIG. 4 is a diagram illustrating an embodiment of an image data encoder of the data transceiver system of FIG. 1.
Figure 5:
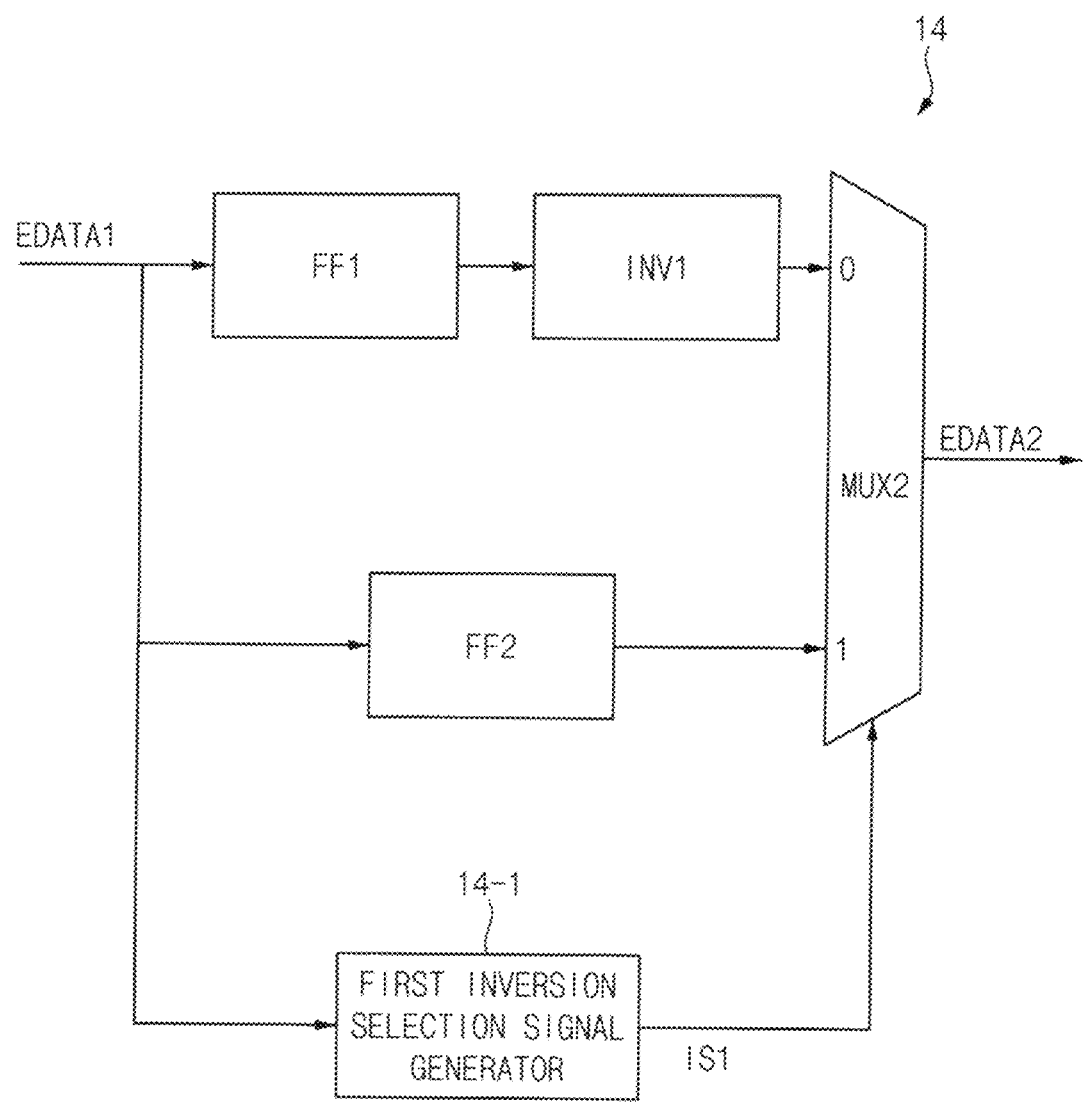
FIG. 5 is a diagram illustrating an embodiment of a first encoded data encoder of the data transceiver system of FIG. 1.
Figure 6:
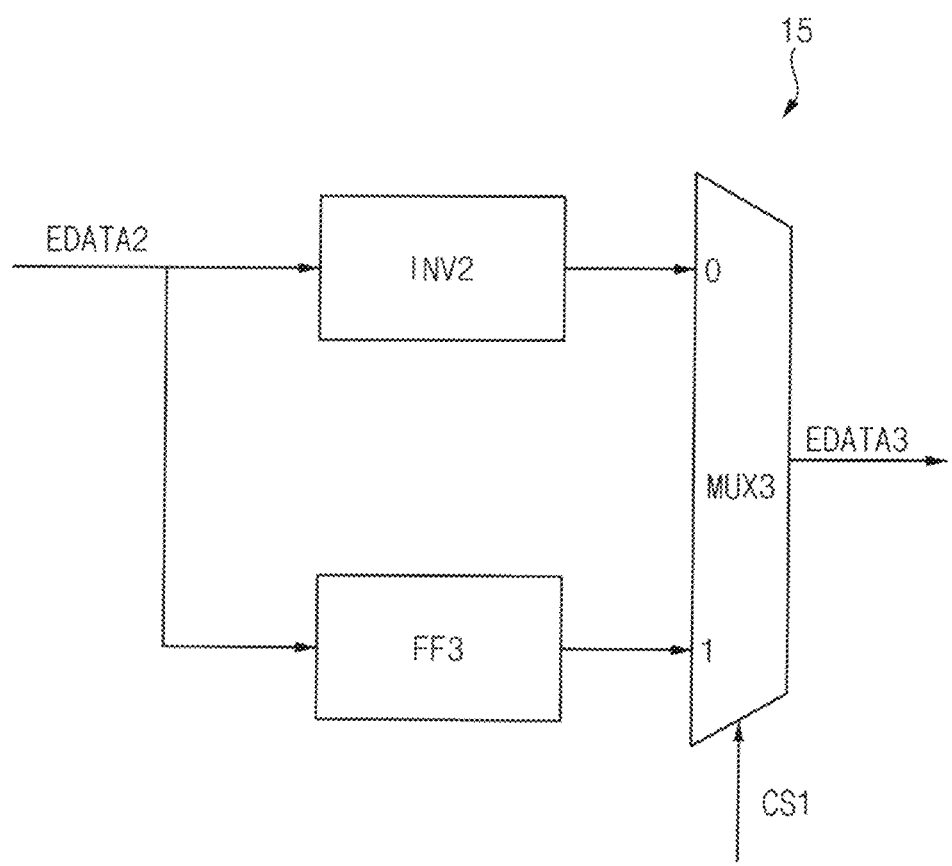
FIG. 6 is a diagram illustrating an embodiment of a second encoded data encoder of the data transceiver system of FIG. 1.
Figure 7:
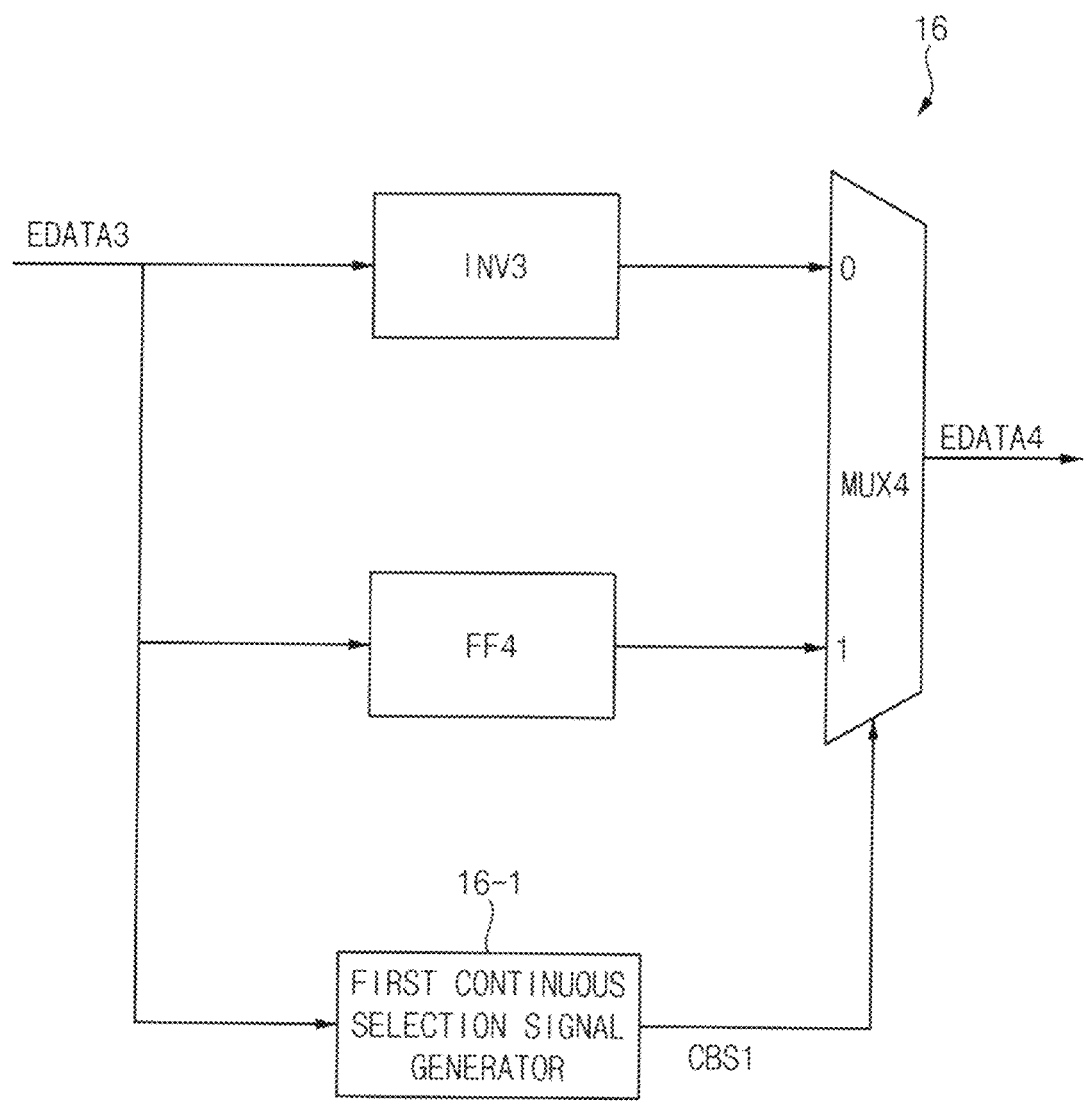
FIG. 7 is a diagram illustrating an embodiment of a third encoded data encoder of the data transceiver system of FIG. 1.

FIG. 3 is a table illustrating an embodiment in which the data transceiver system 1000 of FIG. 1 encodes, FIG. 4 is a diagram illustrating an embodiment of the image data encoder 12 of the data transceiver system 1000 of FIG. 1, FIG. 5 is a diagram illustrating an embodiment of the first encoded data encoder 14 of the data transceiver system 1000 of FIG. 1, FIG. 6 is a diagram illustrating an embodiment of the second encoded data encoder 15 of the data transceiver system 1000 of FIG. 1, and FIG. 7 is a diagram illustrating an embodiment of the third encoded data encoder 16 of the data transceiver system 1000 of FIG. 1.

Referring to FIGS. 2 to 5, the image data encoder 12 may generate the first encoded data EDATA1 by performing the logical operation based on the random number RN and the image data IMG. The image data encoder 12 may generate the first encoded data EDATA1 by selectively performing the first logical operation or the second logical operation. In an embodiment, the first logical operation may be a XOR logical operation, and the second logical operation may be a XNOR logical operation.

In an embodiment, the image data encoder 12 may include a first XOR operation circuit XOR1 performing the first logical operation, a first XNOR operation circuit XNOR1 performing the second logical operation, and a first multiplexer MUX1 including a first input terminal connected to the first XOR operation circuit XOR1, a second input terminal connected to the first XNOR operation circuit XNOR1, a control terminal receiving the first operation selection signal OS1, and an output terminal outputting the first encoded data EDATA1, for example. A first selector 13 may determine the logical operation to be performed and output the first operation selection signal OS1. The first selector 13 may receive the image data IMG, the random number RN, and the second encoded data EDATA2 to determine the logical operation to be performed. A detailed description thereof will be given later.

The first encoded data encoder 14 may generate the second encoded data EDATA2 by inverting the first encoded data EDATA1 every N bits. The first encoded data encoder 14 may invert a K-th bit, where K is a multiple of N, of the first encoded data EDATA1. A K-th bit of the second encoded data EDATA2 may be the same as the K-th bit of the first encoded data EDATA1, and a (K+1)-th bit of the second encoded data EDATA2 may be the same as a bit generated by inverting the K-th bit of the first encoded data EDATA1. That is, the second encoded data EDATA2 may be the same as the first encoded data EDATA1 except for the (K+1)-th bit.

In an embodiment, the first encoded data encoder 14 may include a first delayer FF1 delaying the first encoded data EDATA1 by 1 bit, a first inverter INV1 inverting the first encoded data EDATA1 delayed by the first delayer FF1, and a second multiplexer MUX2 including a first input terminal connected to the first inverter INV1, a second input terminal receiving the first encoded data EDATA1, a control terminal receiving a first inversion selection signal IS1, and an output terminal outputting the second encoded data EDATA2, for example. The first encoded data encoder 14 may include a second delayer FF2 for synchronizing input timing of the inverted first encoded data applied to the second multiplexer MUX2 and the first encoded data EDATA1 applied to the second multiplexer MUX2. The first delayer FF1 and the second delayer FF2 may be flip-flops. The first encoded data encoder 14 may include a first inversion selection signal generator 14-1 generating the first inversion selection signal IS1. In an embodiment, the first inversion selection signal generator 14-1 may receive the first encoded data EDATA1 and output the first inversion selection signal IS1 having a value of 0 every N bits. That is, when the first inversion selection signal generator 14-1 outputs a value of 0 when receiving the K-th bit of the first encoded data EDATA1, the first inversion selection signal generator 14-1 may output a value of 0 in the (K+N)-th bit. In another embodiment, the first inversion selection signal generator 14-1 may receive the image data IMG and output the first inversion selection signal IS1 having a value of 0 every N bits.

Hereinafter, for convenience of description, it is assumed that the first logical operation is the XOR logical operation, the second logical operation is the XNOR logical operation, the image data IMG is 1101/1110/0011/0010/0100/0001/01 (for convenience of explanation, they are divided into four sections.), the random number RN is 0101/0001/1001/1110/1010/0110/11, and N is 4.

In an embodiment, the encoder 10 may generate a (M+1)-th bit, where M is a positive integer, of the first encoded data EDATA1 by performing the first logical operation when a M-th bit of the second encoded data EDATA2 is a same as a value generated by performing the first logical operation based on the random number RN and the image data IMG, and generate the (M+1)-th bit of the first encoded data EDATA1 by performing the second logical operation when the M-th bit of the second encoded data EDATA2 is a same as a value generated by performing the second logical operation based on the random number RN and the image data IMG. The encoder 10 may fixedly generate a first bit of the first encoded data EDATA1 by performing the first logical operation.

In an embodiment, as shown in FIG. 3, the first bit of the first encoded data EDATA1 may be generated as 1 by performing the logical XOR operation on the image data IMG of 1 and the random number RN of 0 (i.e., in FIG. 4, the first operation selection signal OS1 is a 0), for example. Also, since the first bit is not the (K+1)-th bit (i.e., ((a multiple of 4)+1)-th bit), the first bit of the second encoded data EDATA2 may be the same as the first bit of the first encoded data EDATA1. Accordingly, the second bit of the first encoded data EDATA1 may be generated by performing the same XOR logic operation.

In an embodiment, as shown in FIG. 3, a fifth bit of the first encoded data EDATA1 may be generated as 1 by performing the logical XOR operation on the image data IMG of 1 and the random number RN of 0, for example. But, since the fifth bit is the (K+1)-th bit, the fifth bit of the second encoded data EDATA2 may be 1 generated by inverting a fourth bit of the first encoded data EDATA1. 1 may be generated by performing the XOR operation based on 1, which is the fifth bit of the image data IMG, and 0, which is the fifth bit of the random number RN. Accordingly, the sixth bit of the first encoded data EDATA1 may be generated by performing the same XOR logic operation.

In an embodiment, as shown in FIG. 3, a ninth bit of the first encoded data EDATA1 may be generated as 1 by performing the logical XOR operation on the image data IMG of 0 and the random number RN of 1, for example. But, since the ninth bit is the (K+1)-th bit, the ninth bit of the second encoded data EDATA2 may be 0 generated by inverting an eighth bit of the first encoded data EDATA1. 0 may be generated by performing the XOR operation based on 0, which is the ninth bit of the image data IMG, and 1, which is the ninth bit of the random number RN. Accordingly, the tenth bit of the first encoded data EDATA1 may be generated by performing the XNOR logic operation.

In an embodiment, the encoder 10 may generate from a (K+2)-th bit of the first encoded data EDATA1 to a (K+N+1)-th bit of the first encoded data EDATA1 by performing the first logical operation when a (K+1)-th bit of the second encoded data EDATA2 is a same as a value generated by performing the first logical operation based on the random number RN and the image data IMG, and generate from the (K+2)-th bit of the first encoded data EDATA1 to the (K+N+1)-th bit of the first encoded data EDATA1 by performing the second logical operation when the (K+1)-th bit of the second encoded data EDATA2 is a same as a value generated by performing the second logical operation based on the random number RN and the image data IMG. The encoder 10 may fixedly generate the first bit of the first encoded data EDATA1 by performing the first logical operation.

In an embodiment, as shown in FIG. 3, the first bit of the first encoded data EDATA1 may be generated as 1 by performing the logical XOR operation on the image data IMG of 1 and the random number RN of 0 (i.e., in FIG. 4, the first operation selection signal OS1 is a 0), for example. Also, since the first bit is not the (K+1)-th bit (i.e., ((a multiple of 4)+1)-th bit), the first bit of the second encoded data EDATA2 may be the same as the first bit of the first encoded data EDATA1. Accordingly, the second bit of the first encoded data EDATA1 may be generated by performing the same XOR logic operation.

In an embodiment, as shown in FIG. 3, the fifth bit of the first encoded data EDATA1 may be generated as 1 by performing the logical XOR operation on the image data IMG of 1 and the random number RN of 0, for example. But, since the fifth bit is the (K+1)-th bit, the fifth bit of the second encoded data EDATA2 may be 1 generated by inverting the fourth bit of the first encoded data EDATA1. 1 may be generated by performing the XOR operation based on 1, which is the fifth bit of the image data IMG, and 0, which is the fifth bit of the random number RN. Accordingly, the sixth bit to the ninth bit of the first encoded data EDATA1 may be generated by performing the same XOR operation.

In an embodiment, as shown in FIG. 3, the ninth bit of the first encoded data EDATA1 may be generated as 1 by performing the logical XOR operation on the image data IMG of 1 and the random number RN of 0, for example. But, since the ninth bit is the (K+1)-th bit, the ninth bit of the second encoded data EDATA2 may be 0 generated by inverting an eighth bit of the first encoded data EDATA1. 0 may be generated by performing the XOR operation based on 0, which is the ninth bit of the image data IMG, and 1, which is the ninth bit of the random number RN. Accordingly, the tenth bit to a thirteenth bit of the first encoded data EDATA1 may be generated by performing the XNOR logic operation.

In an embodiment, the first random number generator 11 may include a linear feedback shift register ("LFSR") generating the random number RN. In an embodiment, the first random number generator 11 may generate the random number RN by applying seed data SEED to the linear feedback shift register, for example.

The first encoded data EDATA1 generated based on the random number RN may not be decoded without using the same random number. Accordingly, even when data transmitted to the receiver Rx is hacked, information included in the data may be protected.

Also, the data transceiver system 1000 may encode the image data IMG (i.e., encode the image data to the clock embedded data) without overhead data by inverting the first encoded data every N bits to generate the second encoded data EDATA2. Accordingly, the data transceiver system 1000 may not continuously transmit a clock signal separately from the encoded image data. Here, the edge means a period in which 1 bit followed by 0 bit or 0 bit followed by 1 bit.

Referring to FIGS. 2, 3, and 6, the second encoded data encoder 15 may generate third encoded data EDATA3 by inverting the second encoded data EDATA2 when the performed logical operation is converted.

In an embodiment, the second encoded data encoder 15 may include a second inverter INV2 inverting the second encoded data EDATA2, and a third multiplexer MUX3 including a first input terminal connected to the second inverter INV2, a second input terminal receiving the second encoded data EDATA2, a control terminal receiving a first conversion selection signal CS1, and an output terminal outputting the third encoded data EDATA3, for example. The second encoded data encoder 15 may include a third delayer FF3 for synchronizing input timing of the inverted second encoded data applied to the third multiplexer MUX3 and the second encoded data EDATA2 applied to the third multiplexer MUX3. The third delayer FF3 may be a flip-flop. The first selector 13 may determine whether the logical operation is converted and output the first conversion selection signal CS1. In an embodiment, when the first selector 13 converts the logical operation (i.e., from the first logical operation to the second logical operation or from the second logical operation to the first logical operation), the first selector 13 may generate the first conversion selection signal having a value of 0, for example. Although it is illustrated in FIG. 2 that the first selector 13 generates the first operation selection signal OS1 and the first conversion selection signal CS1, the invention is not limited thereto. In an embodiment, a selector receiving the image data IMG, the random number RN, and the second encoded data EDATA2 to generate the first operation selection signal OS1 and a selector receiving the image data IMG, the random number RN, and the second encoded data EDATA2 to generate the first conversion selection signal CS1 (or, receiving the first operation selection signal OS1 to generate the first conversion selection signal) may exist separately, for example.

In an embodiment, the second encoded data encoder 15 may generate the third encoded data EDATA3 by inverting the (K+1)-th bit of the second encoded data EDATA2 when the K-th bit of the first encoded data EDATA1 is generated by the first logical operation and the (K+1)-th bit of the second encoded data EDATA2 is a same as a value generated by performing the second logical operation based on the random number RN and the image data IMG, and generate the third encoded data EDATA3 by inverting the (K+1)-th bit of the second encoded data EDATA2 when the K-th bit of the first encoded data EDATA1 is generated by the second logical operation and the (K+1)-th bit of the second encoded data EDATA2 is a same as a value generated by performing the first logical operation based on the random number RN and the image data IMG.

In an embodiment, as shown in FIG. 3, an eighth bit of the second encoded data EDATA2 may be generated through the XOR logic operation, and the ninth bit 0 of the second encoded data EDATA2 may be the same as a value generated by performing the XNOR logic operation based on 1, which is a ninth bit of the random number RN, and 0, which is a ninth bit of the image data IMG, for example. Accordingly, the ninth bit of the third encoded data EDATA3 may be 1 generated by inverting the ninth bit of the second encoded data EDATA2.

In an embodiment, as shown in FIG. 3, a twentieth bit of the second encoded data EDATA2 may be generated through the XNOR logic operation, and the twenty-first bit 0 of the second encoded data EDATA2 may be the same as a value generated by performing the XOR operation based on 0, which is a twenty-first bit of the random number RN, and 0, which is a twenty-first bit of the image data IMG, for example. Accordingly, the twenty-first bit of the third encoded data EDATA3 may be 1 generated by inverting a twentieth bit of the second encoded data EDATA2.

The first selector 13 may convert the logic operation when receiving the ninth bit, the twenty-first bit, and a twenty-fifth bit of the second encoded data EDATA2, and the ninth bit, the twenty-first bit, and a twenty-fifth bit of the third encoded data EDATA3 may have values generated by inverting the ninth bit, the twenty-first bit, and the twenty-fifth bit of the second encoded data EDATA2. As such, when the logical operation is converted, the third encoded data EDATA3 may have a value generated by inverting the second encoded data EDATA2. Since the conversion of the logical operation occurs when the first encoded data EDATA1 is inverted, the second encoded data encoder 15 may include information on whether or not the logical operation is converted in bits (e.g., (K+1)-th bits) of a predetermined cycle.

Referring to FIGS. 2, 3, and 7, the third encoded data encoder 16 may generate the fourth encoded data EDATA4 by inverting a (K+1)-th bit of the third encoded data EDATA3 when the third encoded data EDATA3 has the same value from the (K−N+1)-th bit to the K-th bit.

In an embodiment, the third encoded data encoder 16 may include a third inverter INV3 inverting the third encoded data EDATA3, a first continuous selection signal generator 16-1 determining whether the third encoded data EDATA3 has the same value from the (K−N+1)-th bit to the K-th bit and outputting a first continuous selection signal CBS1, and a fourth multiplexer MUX4 including a first input terminal connected to the third inverter INV3, a second input terminal receiving the third encoded data EDATA3, a control terminal receiving the first continuous selection signal CBS1, and an output terminal outputting the fourth encoded data EDATA4, for example. The third encoded data encoder 16 may include a fourth delayer FF4 for synchronizing input timing of the inverted third encoded data applied to the fourth multiplexer MUX4 and the third encoded data EDATA3 applied to the fourth multiplexer MUX4. The fourth delayer FF4 may be a flip-flop. In an embodiment, the first continuous selection signal generator 16-1 may receive the third encoded data EDATA3 and output the first continuous selection signal CBS1 having a value of 0 when the third encoded data EDATA3 has the same value from the (K−N+1)-th bit to the K-th bit.

In an embodiment, as shown in FIG. 3, since the fifth to eighth bits and the twenty-first to twenty-fourth bits of the third encoded data EDATA3 have the same value, the ninth bit of the fourth encoded data EDATA4 may have a value of 0 generated by inverting the ninth bit of the third encoded data EDATA3 and the twenty-fifth bit of the fourth encoded data EDATA4 may have a value of 0 generated by inverting the twenty-fifth bit of the third encoded data EDATA3, for example.

Accordingly, the third encoded data EDATA3 may be encoded by generating an edge in the third encoded data EDATA3. Accordingly, the data transceiver system 1000 may not continuously transmit the clock signal separately from the encoded image data by preventing the same bit from being repeated in the transmitted data.

Figure 8:
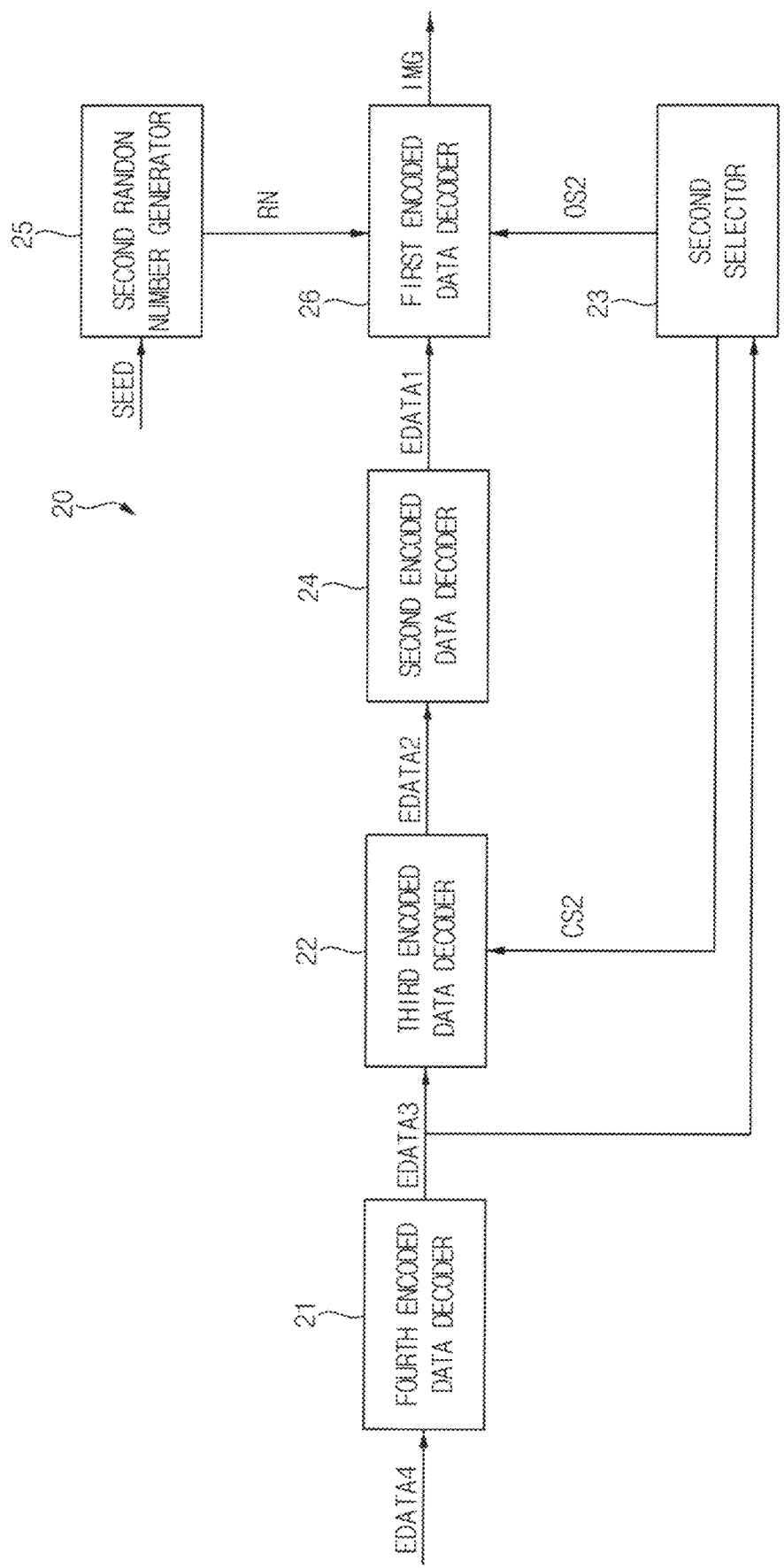
FIG. 8 is a block diagram illustrating an embodiment of a decoder of the data transceiver system of FIG. 1.

FIG. 8 is a block diagram illustrating an embodiment of the decoder 20 of the data transceiver system 1000 of FIG. 1.

Referring to FIG. 8, the decoder 20 may restore the first encoded data EDATA1 by decoding the second encoded data EDATA2, and restore the image data IMG by decoding the first encoded data EDATA1. In an embodiment, the decoder 20 may restore the second encoded data EDATA2 by decoding the third encoded data EDATA3. In an embodiment, the decoder 20 may restore the third encoded data EDATA3 by decoding the fourth encoded data EDATA4.

The decoder 20 may include a fourth encoded data decoder 21, a third encoded data decoder 22, a second selector 23, a second encoded data decoder 24, a second random number generator 25, and a first encoded data decoder 26. A detailed description thereof will be given later.

Figure 9:
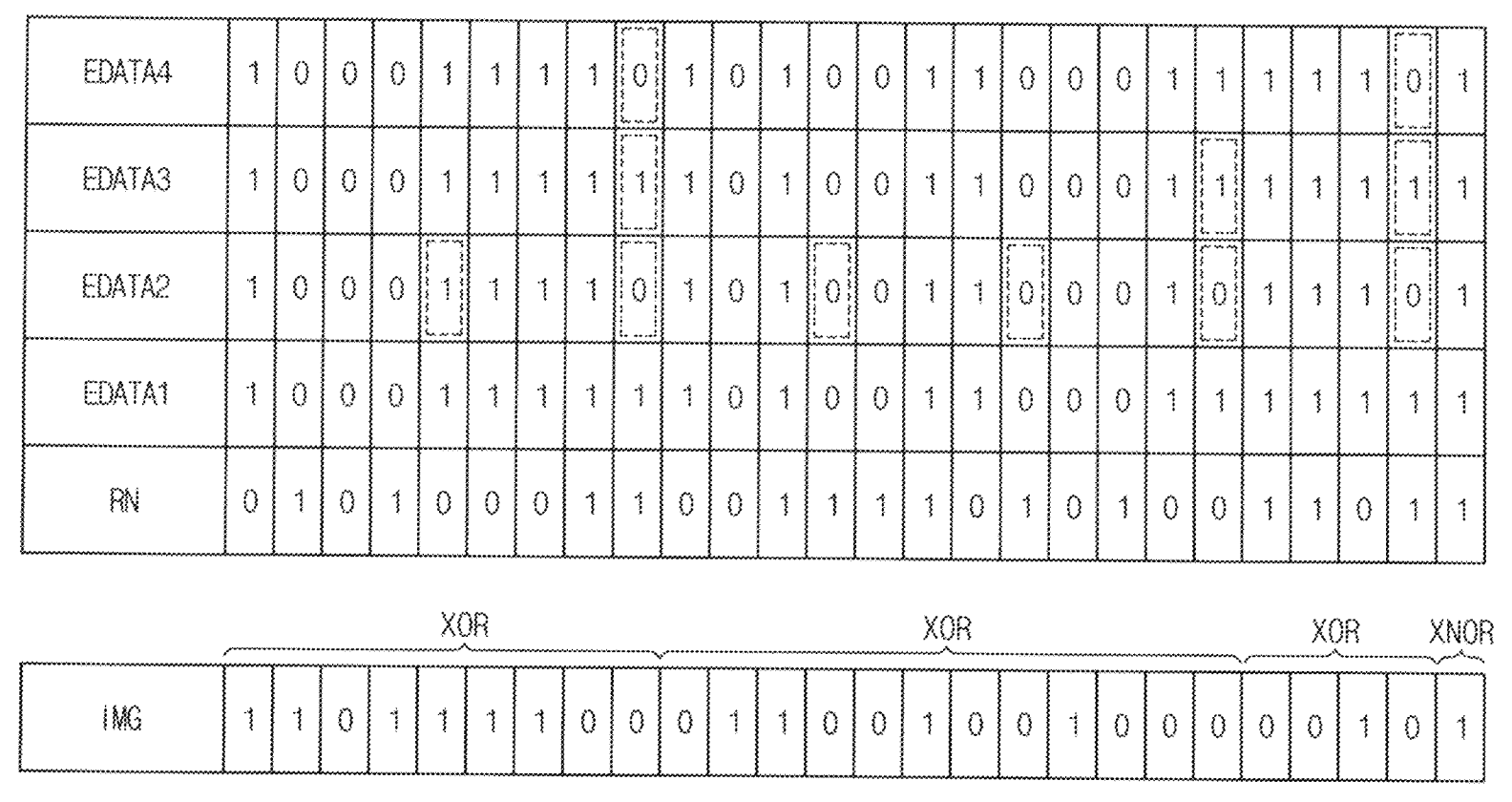
Figure 10:
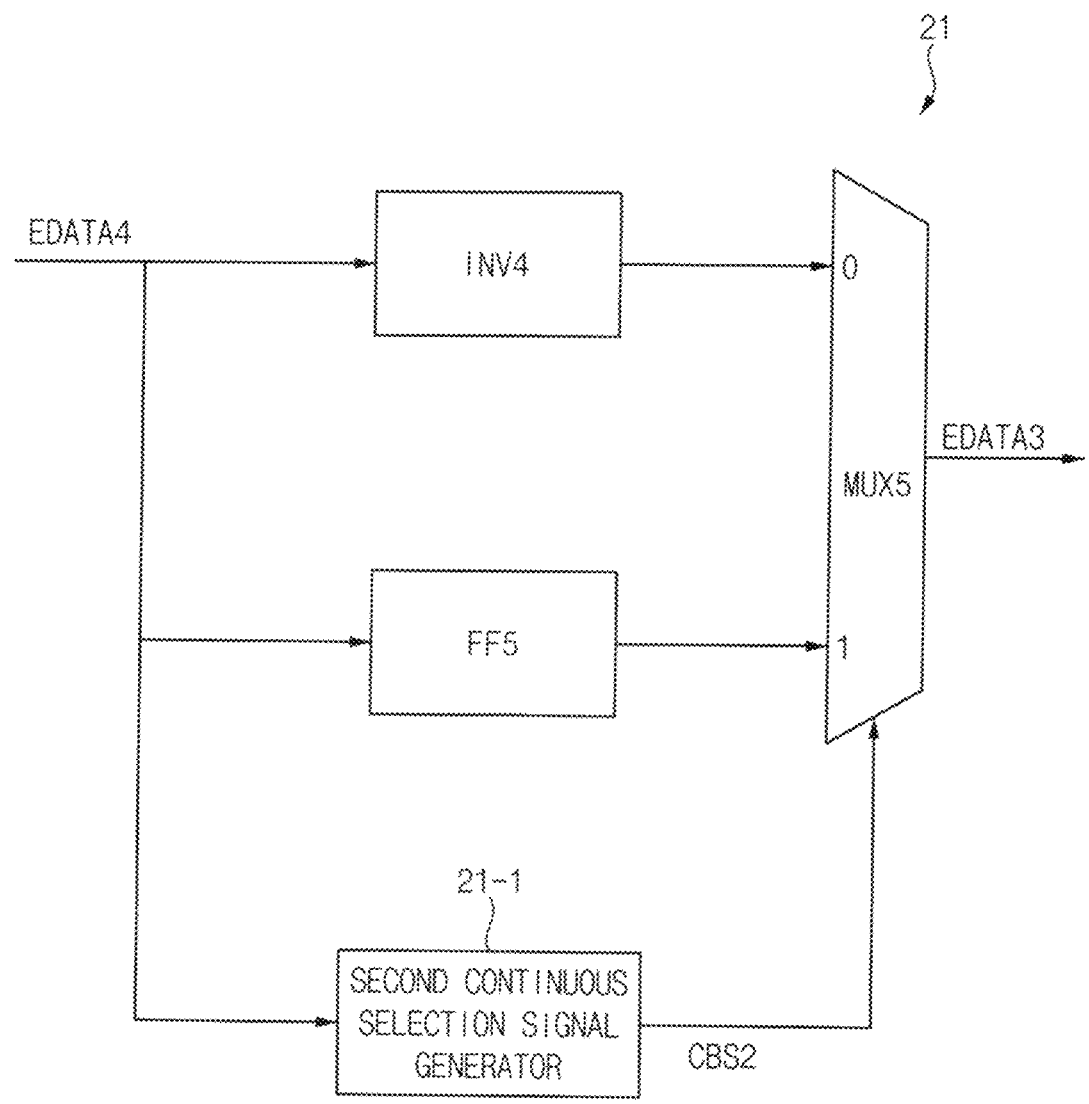
FIG. 10 is a diagram illustrating an embodiment of a fourth encoded data decoder of the data transceiver system of FIG. 1.
Figure 11:
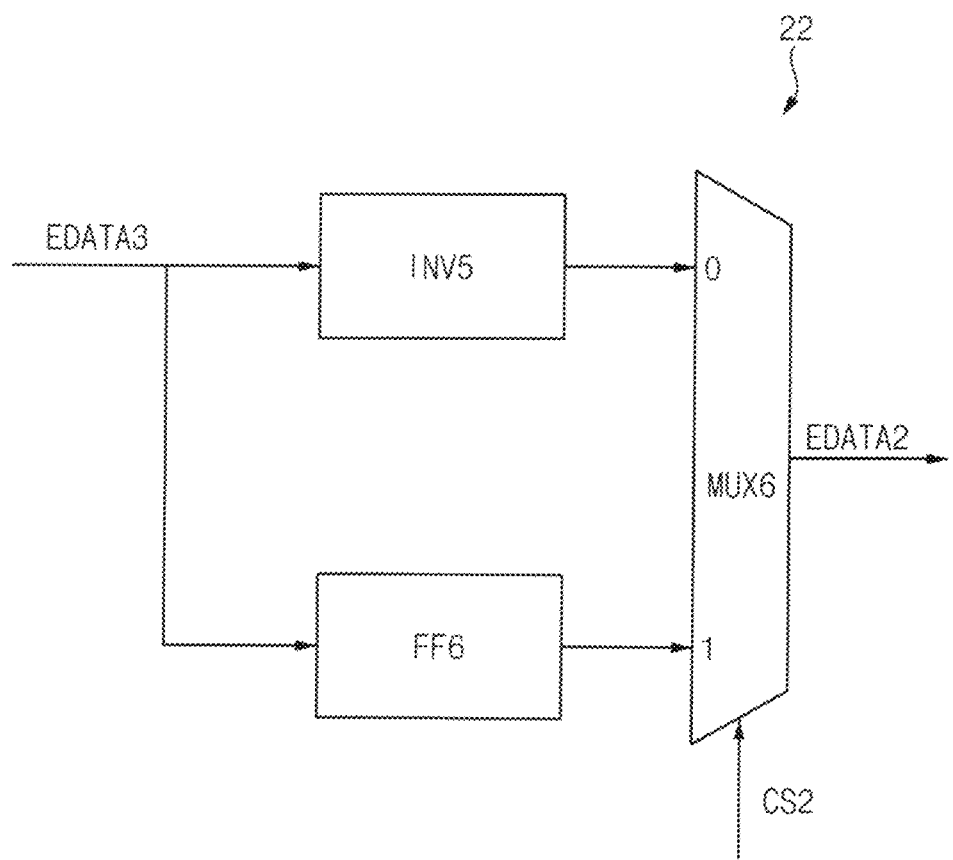
FIG. 11 is a diagram illustrating an embodiment of a third encoded data decoder of the data transceiver system of FIG. 1.
Figure 12:
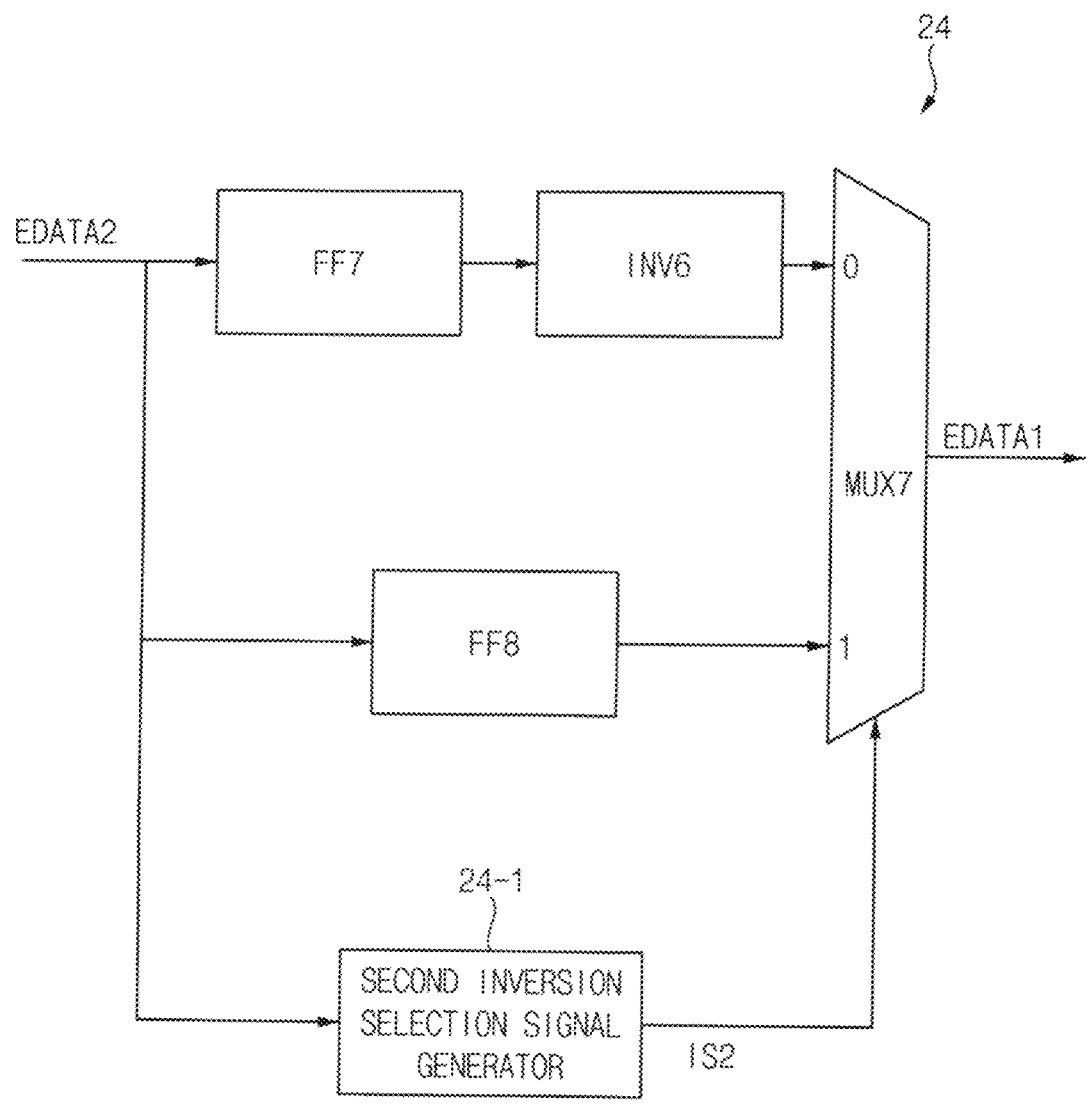
FIG. 12 is a diagram illustrating an embodiment of a second encoded data decoder of the data transceiver system of FIG. 1.
Figure 13:
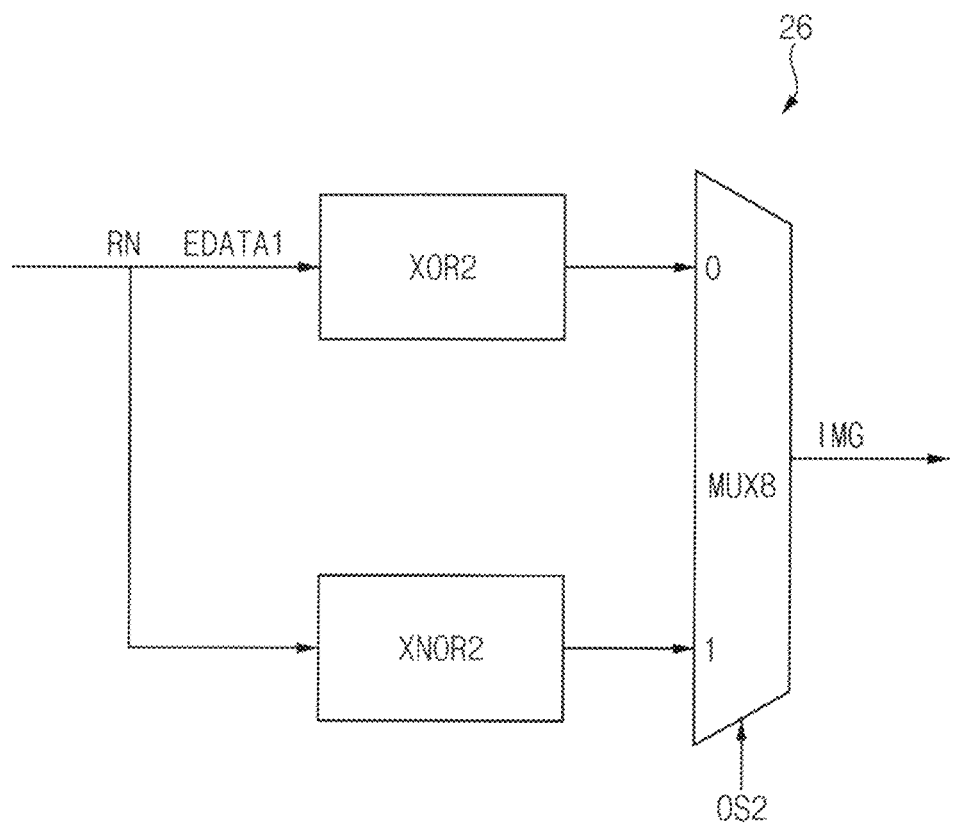
FIG. 13 is a diagram illustrating an embodiment of a first encoded data decoder of the data transceiver system of FIG. 1.

FIG. 9 is a table illustrating an embodiment in which the data transceiver system 1000 of FIG. 1 decodes, FIG. 10 is a diagram illustrating an embodiment of the fourth encoded data decoder 21 of the data transceiver system 1000 of FIG. 1, FIG. 11 is a diagram illustrating an embodiment of the third encoded data decoder 22 of the data transceiver system 1000 of FIG. 1, FIG. 12 is a diagram illustrating an embodiment of the second encoded data decoder 24 of the data transceiver system 1000 of FIG. 1, and FIG. 13 is a diagram illustrating an embodiment of the first encoded data decoder 26 of the data transceiver system 1000 of FIG. 1.

Referring to FIGS. 8 to 10, when the fourth encoded data EDATA4 has the same value from the (K−N+1)-th bit to the K-th bit, the fourth encoded data decoder 21 may restore the third encoded data EDATA3 by inverting the (K+1)-th bit of EDATA4.

In an embodiment, the fourth encoded data decoder 21 may include a fourth inverter INV4 inverting the fourth encoded data EDATA4, a second continuous selection signal generator 21-1 determining whether the fourth encoded data EDATA4 has the same value from the (K−N+1)-th bit to the K-th bit and outputting a second continuous selection signal CBS2, and a fifth multiplexer MUX5 including a first input terminal connected to the fourth inverter INV4, a second input terminal receiving the fourth encoded data EDATA4, a control terminal receiving the second continuous selection signal CBS2, and an output terminal outputting the third encoded data EDATA3, for example. The fourth encoded data decoder 21 may include a fifth delayer FF5 for synchronizing input timing of the inverted fourth encoded data applied to the fifth multiplexer MUX5 and the fourth encoded data EDATA4 applied to the fifth multiplexer MUX5. The fifth delayer FF5 may be a flip-flop. In an embodiment, the second continuous selection signal generator 21-1 may receive the fourth encoded data EDATA4 and output the second continuous selection signal CBS2 having a value of 0 when the fourth encoded data EDATA4 has the same value from the (K−N+1)-th bit to the K-th bit.

In an embodiment, as shown in FIG. 9, since the fifth to eighth bits and the twenty-first to twenty-fourth bits of the fourth encoded data EDATA4 have the same value, the ninth bit of the third encoded data EDATA3 may have a value of 1 generated by inverting the ninth bit of the fourth encoded data EDATA4 and the twenty-fifth bit of the third encoded data EDATA3 may have a value of 0 generated by inverting the twenty-fifth bit of the fourth encoded data EDATA3, for example.

Referring to FIGS. 2, 8, 9 and 11, the third encoded data decoder 22 may decode the third encoded data EDATA3 to generate the second encoded data EDATA2.

In an embodiment, the third encoded data decoder 22 may include a fifth inverter INV5 inverting the third encoded data EDATA3, and a sixth multiplexer MUX6 including a first input terminal connected to the fifth inverter INV5, a second input terminal receiving the third encoded data EDATA3, a control terminal receiving a second conversion selection signal CS2, and an output terminal outputting the second encoded data EDATA2, for example. The third encoded data decoder 22 may include a sixth delayer FF6 for synchronizing input timing of the inverted third encoded data applied to the sixth multiplexer MUX6 and the third encoded data EDATA3 applied to the sixth multiplexer MUX6. The sixth delayer FF6 may be a flip-flop. The second selector 23 may determine whether the logical operation is converted by performing the image data encoder 12 and output the second conversion selection signal CS2. In an embodiment, when the second selector 23 converts the logical operation (i.e., from the first logical operation to the second logical operation or from the second logical operation to the first logical operation), the second selector 23 may generate the second conversion selection signal having a value of 0, for example. Although it is illustrated in FIG. 8 that the second selector 23 generates the second operation selection signal OS2 and the second conversion selection signal CS2, the invention is not limited thereto. In an embodiment, a selector receiving the third encoded data EDATA3 to generate the second operation selection signal OS2 (or, receiving the second conversion selection signal CS2 to generate the second operation selection signal OS2) and a selector receiving the third encoded data EDATA3 to generate the second conversion selection signal CS2 may exist separately, for example.

In an embodiment, as shown in FIG. 9, an eighth bit of the second encoded data EDATA2 may be generated through the XOR logic operation, and the ninth bit 0 of the second encoded data EDATA2 may be the same as a value generated by performing the XNOR logic operation based on 1, which is a ninth bit of the random number RN, and 0, which is a ninth bit of the image data IMG, for example. Accordingly, the ninth bit of the third encoded data EDATA3 may be 1 generated by inverting the ninth bit of the second encoded data EDATA2.

In an embodiment, as shown in FIG. 9, since the third encoded data decoder 22 includes information on whether or not the logical operation is converted in bits (e.g., (K+1)-th bits) of a predetermined cycle, the third encoded data decoder 22 may restore the second encoded data EDATA2 by inverting the third encoded data EDATA3 when the (K+1)-th bit and the K-th bit of the third encoded data EDATA3 are the same, for example.

Referring to FIGS. 8, 9 and 12, the second encoded data decoder 24 may restore the first encoded data EDATA1 by inverting the second encoded data EDATA2 every N bits. The second encoded data decoder 24 may invert the K-th bit of the second encoded data EDATA2. The Kth bit of the first encoded data EDATA1 is the same as the Kth bit of the second encoded data EDATA2, and the (K+1)-th bit of the first encoded data EDATA1 may be the same as a bit generated by inverting the K-th bit of the second encoded data EDATA2.

In an embodiment, the second encoded data decoder 24 may include a seventh delayer FF7 delaying the second encoded data EDATA2 by 1 bit, a sixth inverter INV6 inverting the second encoded data EDATA2 delayed by the seventh delayer FF7, and a seventh multiplexer MUX7 including a first input terminal connected to the sixth inverter INV6, a second input terminal receiving the second encoded data EDATA2, a control terminal receiving a second inversion selection signal IS2, and an output terminal outputting the first encoded data EDATA1, for example. The second encoded data decoder 24 may include a eighth delayer FF8 for synchronizing input timing of the inverted second encoded data applied to the seventh multiplexer MUX7 and the second encoded data EDATA2 applied to the seventh multiplexer MUX7. The seventh delayer FF7 and the eighth delayer FF8 may be flip-flops. The second encoded data decoder 24 may include a second inversion selection signal generator 24-1 generating the second inversion selection signal IS2. In an embodiment, the second inversion selection signal generator 24-1 may receive the second encoded data EDATA2 and output the second inversion selection signal IS2 having a value of 0 every N bits. That is, when the second inversion selection signal generator 24-1 outputs a value of 0 when receiving the K-th bit of the second encoded data EDATA2, the second inversion selection signal generator 24-1 may output a value of 0 in the (K+N)-th bit.

Referring to FIGS. 2, 8, 9 and 13, the first encoded data decoder 26 may perform the logical operation based on the random number RN and the first encoded data EDATA1 to restore the image data IMG. The first encoded data decoder 26 may restore the image data IMG by selectively performing the first logical operation or the second logical operation. In an embodiment, the first logical operation may be the XOR logical operation, and the second logical operation may be the XNOR logical operation. However, the first logical operation and the second logical operation are not limited thereto.

In an embodiment, the first encoded data decoder 26 may include a second XOR operation circuit XOR2 performing the first logical operation, a second XNOR operation circuit XNOR2 performing the second logical operation, and a eighth multiplexer MUX8 including a first input terminal connected to the second XOR operation circuit XOR2, a second input terminal connected to the second XNOR operation circuit XNOR2, a control terminal receiving the second operation selection signal OS2, and an output terminal outputting the image data IMG, for example. A second selector 23 may determine the logical operation to be performed and output the second operation selection signal OS2. The second selector 23 may receive the third encoded data EDATA3 to determine the logical operation to be performed.

In an embodiment, the second selector 23 may initially determine the same logical operation as the image data encoder 12, for example. Thereafter, the second selector 23 may determine whether to convert the logical operation performed by the image data encoder 12 based on the third encoded data EDATA3, and convert the logical operation performed by the first encoded data decoder 26 when the logical operation performed by the image data encoder 12 is converted.

In an embodiment, the second random number generator 25 may include a linear feedback shift register (LFSR)

generating the random number RN. In an embodiment, the second random number generator 25 may generate the random number RN by applying the same seed data SEED as that of the first random number generator 11 to the linear feedback shift register, for example. Accordingly, the second random number generator 25 may generate the same random number as the first random number generator 11.

Figure 14:
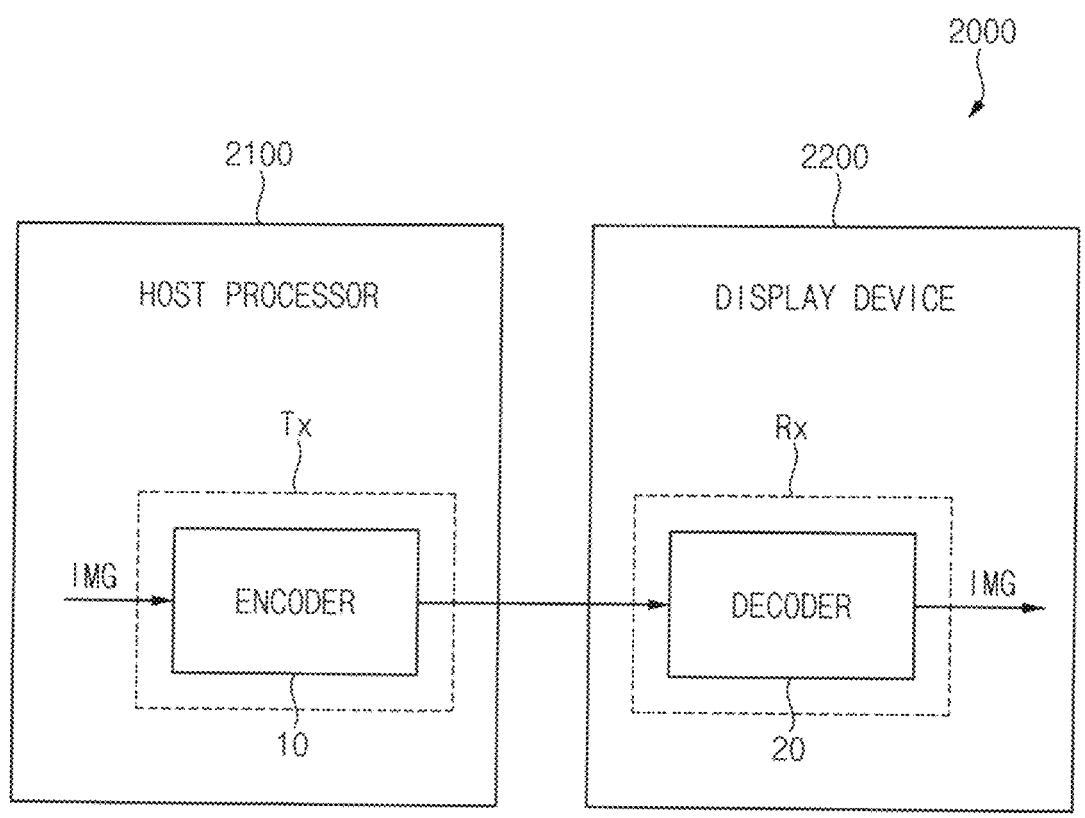
FIG. 14 is a diagram illustrating an embodiment of a display system.

FIG. 14 is a diagram illustrating an embodiment of a display system 2000.

An encoder and a decoder of the display system 2000 in the illustrated embodiment is substantially the same as the encoder and the decoder of the data transceiver system 1000 of FIG. 1. Thus, the same reference numerals are used to refer to the same or similar element, and any repetitive explanation will be omitted.

Referring to FIGS. 1, 2, and 14, a host processor 2100 may generate the image data IMG, and encode the image data IMG to transmit the image data IMG. The host processor 2100 may include a transmitter Tx. The transmitter Tx may include an encoder 10 encoding the image data IMG. The host processor 2100 may transmit the image data IMG from the transmitter Tx to the receiver Rx through one lane (i.e., using a serial interface).

The transmitter Tx may include the encoder 10 generating first encoded data EDATA1 by performing the logical operation based on the random number RN and the image data IMG, and generating second encoded data EDATA2 by inverting the first encoded data EDATA1 every N bits. In an embodiment, the encoder 10 may generate the first encoded data EDATA1 by selectively performing the first logical operation or the second logical operation different from the first logical operation, and generate third encoded data EDATA3 by inverting the second encoded data EDATA2 when the performed logical operation is converted. The encoder 10 may generate fourth encoded data EDATA4 by inverting the (K+1)-th bit of the third encoded data EDATA3 when the third encoded data EDATA3 has the same value from the (K−N+1)-th bit to the K-th bit.

In an embodiment, the host processor 2100 may be implemented as a graphic processing unit ("GPU"), an application processor ("AP"), or the like, for example.

The display device 2200 may restore the image data IMG by receiving the encoded data. The display device 2200 may include a receiver Rx. The receiver Rx may include a decoder 20 decoding the encoded data to restore the image data IMG.

The receiver Rx may include the decoder 20 decoding the second encoded data EDATA2 to restore the first encoded data EDATA1, and decoding the first encoded data EDATA1 to restore the image data IMG. In an embodiment, the decoder 20 may decode the third encoded data EDATA3 to restore the second encoded data EDATA2. In an embodiment, the decoder 20 may decode the fourth encoded data EDATA4 to restore the third encoded data EDATA3.

The display device 2200 may display an image based on the image data IMG. The display device 2200 may receive the image data IMG and display the image on a display panel included in the display device 2200 based on the image data IMG.

Figure 15:
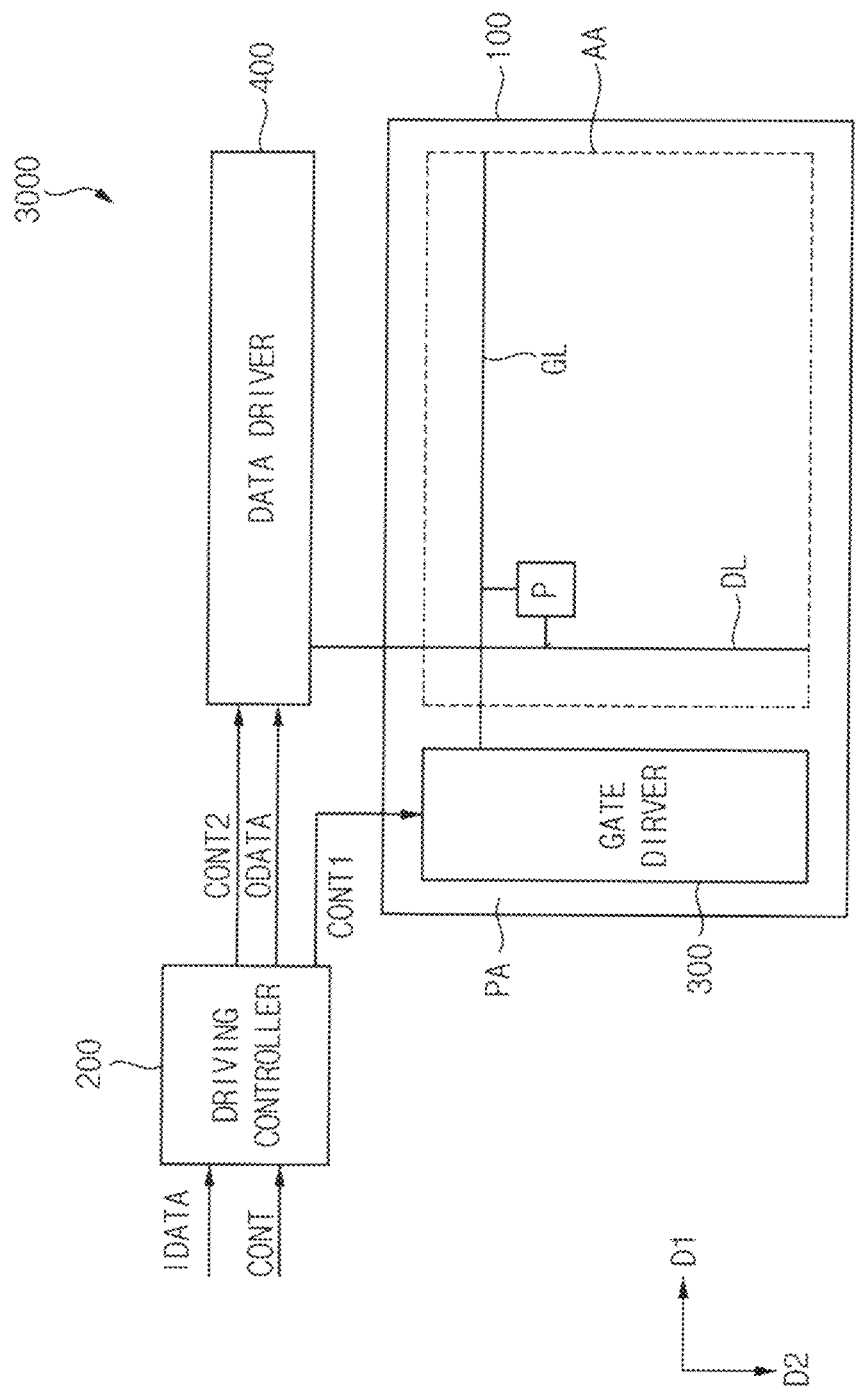
FIG. 15 is a block diagram illustrating an embodiment of a display device.
Figure 16:
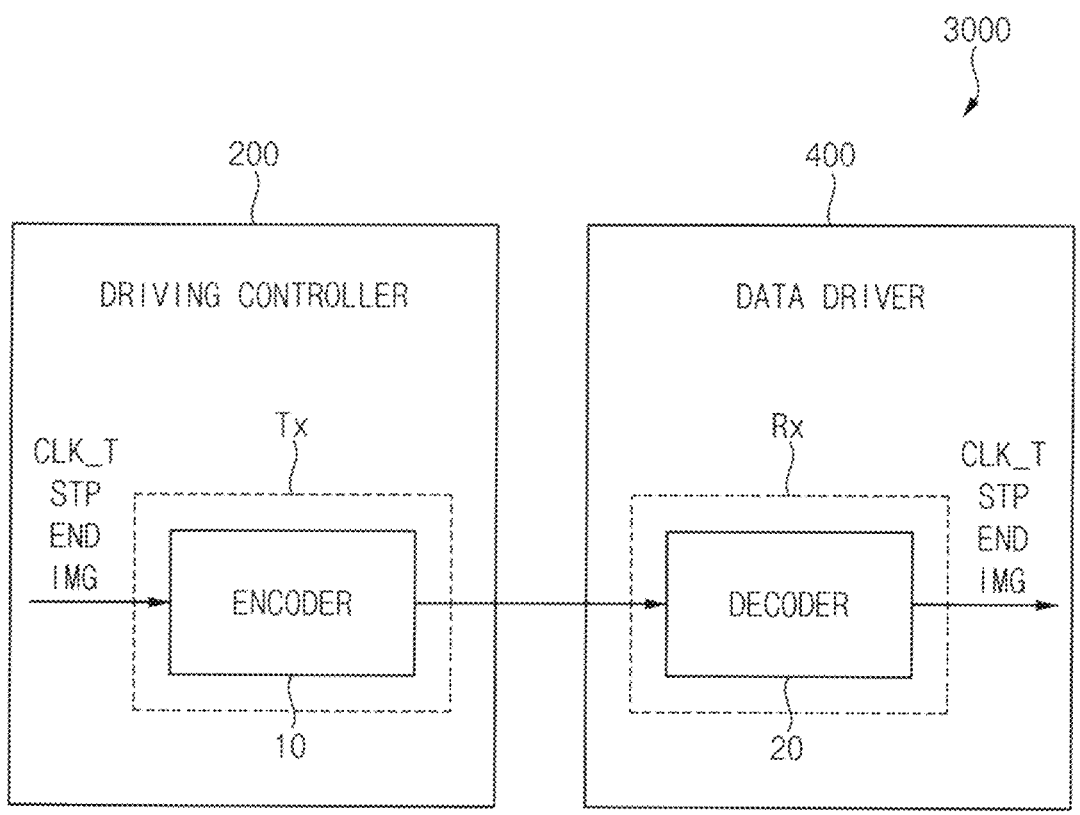
FIG. 16 is a diagram illustrating an embodiment in which the display device of FIG. 15 transmits data to a data driver.
Figure 17:
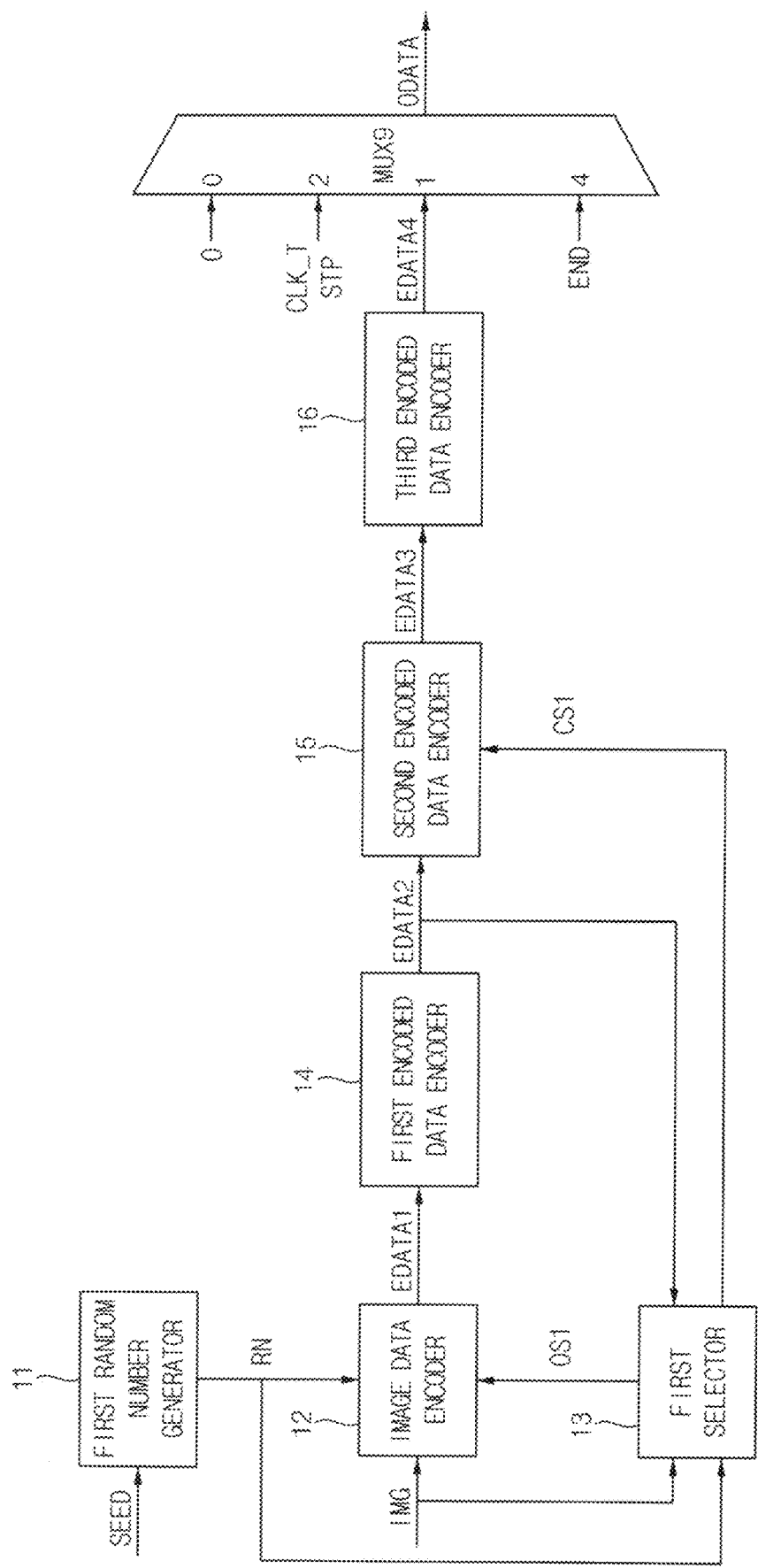
FIG. 17 is a diagram illustrating an embodiment of an encoder of the display device of FIG. 15.

FIG. 15 is a block diagram illustrating an embodiment of a display device 3000 in embodiments, FIG. 16 is a diagram illustrating an embodiment in which the display device 3000 of FIG. 15 transmits data to a data driver 400, and FIG. 17 is a diagram illustrating an embodiment of an encoder 10 of the display device 3000 of FIG. 15.

An encoder 10 and a decoder 20 of the display device 3000 in the illustrated embodiment are substantially the same as the encoder and the decoder of the data transceiver system 1000 of FIG. 1 except for a ninth multiplexer MUX9. Thus, the same reference numerals are used to refer to the same or similar element, and any repetitive explanation will be omitted.

Referring to FIGS. 1, 15, to 17, the display device 3000 may include a display panel 100, a driving controller 200, a gate driver 300, and the data driver 400. In an embodiment, the driving controller 200 and the data driver 400 may be integrated into one chip.

The display panel 100 has a display region AA on which an image is displayed and a peripheral region PA adjacent to the display region AA. In an embodiment, the gate driver 300 may be disposed (e.g., mounted) on the peripheral region PA of the display panel 100.

The display panel 100 may include a plurality of gate lines GL, a plurality of data lines DL, and a plurality of pixels P electrically connected to the data lines DL and the gate lines GL. The gate lines GL may extend in a first direction D1 and the data lines DL may extend in a second direction D2 crossing the first direction D1.

The driving controller 200 may receive input image data IDATA and an input control signal CONT from a host processor. In an embodiment, the input image data IDATA may include red image data, green image data and blue image data, for example. In an embodiment, the input image data IDATA may further include white image data. In another embodiment the input image data IDATA may include magenta image data, yellow image data, and cyan image data, for example. The input control signal CONT may include a master clock signal and a data enable signal. The input control signal CONT may further include a vertical synchronizing signal and a horizontal synchronizing signal.

The driving controller 200 may generate a first control signal CONT1, a second control signal CONT2, and output image data ODATA based on the input image data IDATA and the input control signal CONT.

The driving controller 200 may generate the first control signal CONT1 for controlling operation of the gate driver 300 based on the input control signal CONT and output the first control signal CONT1 to the gate driver 300. The first control signal CONT1 may include a vertical start signal and a gate clock signal.

The driving controller 200 may generate the second control signal CONT2 for controlling operation of the data driver 400 based on the input control signal CONT and output the second control signal CONT2 to the data driver 400. The second control signal CONT2 may include a horizontal start signal and a load signal.

The driving controller 200 may receive the input image data IDATA and the input control signal CONT to generate the image data IMG. The driving controller 200 may encode the image data IMG through the encoder 10. The driving controller 200 may generate output image data ODATA including the encoded image data (e.g., the fourth encoded data EDATA4), a clock training signal CLK_T, an active start signal STP, and an active end signal END. The driving controller 200 may output the output image data ODATA to the data driver 400.

The gate driver 300 may generate gate signals for driving the gate lines GL in response to the first control signal CONT1 input from the driving controller 200. The gate driver 300 may output the gate signals to the gate lines GL. In an embodiment, the gate driver 300 may sequentially output the gate signals to the gate lines GL, for example.

The data driver 400 may receive the second control signal CONT2 and the output image data ODATA from the driving controller 200. The data driver 400 may convert the output image data ODATA into data voltages having an analog type. The data driver 400 may output the data voltage to the data lines DL.

The driving controller 200 may generate the image data IMG, and encode the image data IMG to transmit the image data IMG. The driving controller 200 may include a transmitter Tx. The transmitter Tx may include an encoder 10 encoding the image data IMG. The driving controller 200 may transmit the image data IMG from the transmitter Tx to the receiver Rx through one lane (i.e., using a serial interface).

The transmitter Tx may include the encoder 10 generating first encoded data EDATA1 by performing the logical operation based on the random number RN and the image data IMG, and generating second encoded data EDATA2 by inverting the first encoded data EDATA1 every N bits. In an embodiment, the encoder 10 may generate the first encoded data EDATA1 by selectively performing the first logical operation or the second logical operation different from the first logical operation, and generate third encoded data EDATA3 by inverting the second encoded data EDATA2 when the performed logical operation is converted. The encoder 10 may generate fourth encoded data EDATA4 by inverting the (K+1)-th bit of the third encoded data EDATA3 when the third encoded data EDATA3 has the same value from the (K−N+1)-th bit to the K-th bit.

The data driver 400 may restore the image data IMG by receiving the encoded data. The data driver 400 may include a receiver Rx. The receiver Rx may include the decoder 20 decoding the encoded data to restore the image data IMG.

The receiver Rx may include the decoder 20 decoding the second encoded data EDATA2 to restore the first encoded data EDATA1, and decoding the first encoded data EDATA1 to restore the image data IMG. In an embodiment, the decoder 20 may decode the third encoded data EDATA3 to restore the second encoded data EDATA2. In an embodiment, the decoder 20 may decode the fourth encoded data EDATA4 to restore the third encoded data EDATA3.

The encoder 10 may include the first random number generator 11, the image data encoder 12, the first selector 13, the first encoded data encoder 14, the second encoded data encoder 15, the third encoded data encoder 16, and the ninth multiplexer MUX9.

The ninth multiplexer MUX9 may include a first input terminal receiving a signal of 0, a second input terminal receiving the clock training signal CLK_T and the active start signal STP, a third input terminal receiving the fourth encoded data EDATA4, a fourth input terminal receiving the active end signal END, and an output terminal outputting the output image data ODATA.

In an embodiment, the encoder 10 may output the clock training signal CLK_T when an active period starts, output the fourth encoded data EDATA4 in the active period, and not output the fourth encoded data EDATA4 in a blank period.

In an embodiment, one frame may be divided into the active period and the blank period, for example. When the active period starts, the ninth multiplexer MUX9 may output the clock training signal CLK_T and the active start signal STP. The data driver 400 may generate a clock signal based on the clock training signal CLK_T applied in a first frame. The active start signal STP may be a signal indicating a start of the active period to the data driver 400. In the active period, the ninth multiplexer MUX9 may output the fourth encoded data EDATA4. The data driver 400 may restore the image data IMG by decoding the fourth encoded data EDATA4. The data driver 400 may generate the data voltages based on the image data IMG and apply the data voltages to the pixels P. When the active period ends, the ninth multiplexer MUX9 may output the active end signal END. The active end signal END may be a signal indicating an end of the active period to the data driver 400. In the blank period, the ninth multiplexer MUX9 may output a signal of 0. Accordingly, the data driver 400 may generate the clock signal based on the clock training signal CLK_T applied in the first frame, and maintain the clock signal through the fourth encoded data EDATA4 in which an edge is generated.

Embodiments of the embodiments of the invention may be applied to any electronic device including the display device. The embodiments of the invention may be applied to a television ("TV"), a digital TV, a three dimensional ("3D") TV, a mobile phone, a smart phone, a tablet computer, a virtual reality ("VR") device, a wearable electronic device, a personal computer ("PC"), a home appliance, a laptop computer, a personal digital assistant ("PDA"), a portable multimedia player ("PMP"), a digital camera, a music player, a portable game console, a navigation device, etc., for example.

The foregoing is illustrative of the invention and is not to be construed as limiting thereof. Although a few embodiments of the invention have been described, those skilled in the art will readily appreciate that many modifications are possible in the embodiments without materially departing from the novel teachings and advantages of the invention. Accordingly, all such modifications are intended to be included within the scope of the invention as defined in the claims. Therefore, it is to be understood that the foregoing is illustrative of the invention and is not to be construed as limited to the predetermined embodiments disclosed, and that modifications to the disclosed embodiments, as well as other embodiments, are intended to be included within the scope of the appended claims. Embodiments of the invention are defined by the following claims, with equivalents of the claims to be included therein.

What is claimed is:

1. A data transceiver system comprising:
   an encoder which generates first encoded data by performing a logical operation based on a random number and image data, and generates second encoded data by inverting the first encoded data every N bits, where N is a positive integer greater than or equal to 2; and
   a decoder which restores the first encoded data by decoding the second encoded data, and restores the image data by decoding the first encoded data,
   wherein the encoder generates the first encoded data by selectively performing a first logical operation or a second logical operation different from the first logical operation.

2. The data transceiver system of claim 1, wherein the encoder includes:
   a linear feedback shift register which generates the random number.

3. The data transceiver system of claim 1, wherein the encoder generates a (M+1)-th bit, where M is a positive integer, of the first encoded data by performing the first logical operation when a M-th bit of the second encoded data is a same as a value generated by performing the first logical operation based on the random number and the image data, and generates the (M+1)-th bit of the first encoded data by performing the second logical operation when the M-th bit of the second encoded data is a same as a value generated by performing the second logical operation based on the random number and the image data.

4. The data transceiver system of claim 1, wherein the encoder generates from a (K+2)-th bit, where K is a multiple of N, of the first encoded data to a (K+N+1)-th bit of the first encoded data by performing the first logical operation when a (K+1)-th bit of the second encoded data is a same as a value generated by performing the first logical operation based on the random number and the image data, and generates from the (K+2)-th bit of the first encoded data to the (K+N+1)-th bit of the first encoded data by performing the second logical operation when the (K+1)-th bit of the second encoded data is a same as a value generated by performing the second logical operation based on the random number and the image data.

5. The data transceiver system of claim 1, wherein the encoder includes:
   a first XOR operation circuit which performs the first logical operation;
   a first XNOR operation circuit which performs the second logical operation;
   a first selector which determines the logical operation to be performed and outputs a first operation selection signal; and
   a first multiplexer including a first input terminal connected to the first XOR operation circuit, a second input terminal connected to the first XNOR operation circuit, a control terminal which receives the first operation selection signal, and an output terminal which outputs the first encoded data,
   wherein the first logical operation is a XOR logical operation, and
   wherein the second logical operation is a XNOR logical operation.

6. The data transceiver system of claim 1, wherein the encoder inverts a K-th bit, where K is a multiple of N, of the first encoded data,
   wherein a K-th bit of the second encoded data is a same as the K-th bit of the first encoded data, and
   wherein a (K+1)-th bit of the second encoded data is a same as a bit generated by inverting the K-th bit of the first encoded data.

7. The data transceiver system of claim 1, wherein the encoder includes:
   a first delayer which delays the first encoded data by 1 bit;
   a first inverter which inverts the first encoded data delayed by the first delayer; and
   a second multiplexer including a first input terminal connected to the first inverter, a second input terminal which receives the first encoded data, a control terminal which receives a first inversion selection signal, and an output terminal which outputs the second encoded data.

8. The data transceiver system of claim 1, wherein the encoder generates the first encoded data by selectively performing a first logical operation or a second logical operation different from the first logical operation, and generates third encoded data by inverting the second encoded data when the performed logical operation is converted, and
   wherein the decoder restores the second encoded data by decoding the third encoded data.

9. The data transceiver system of claim 8, wherein the encoder generates from a (K+2)-th bit, where K is a multiple of N, of the first encoded data to the (K+N+1)-th bit of the first encoded data by performing the first logical operation when a (K+1)-th bit of the second encoded data is a same as a value generated by performing the first logical operation based on the random number and the image data, generates from the (K+2)-th bit of the first encoded data to the (K+N+1)-th bit of the first encoded data by performing the second logical operation when the (K+1)-th bit of the second encoded data is a same as a value generated by performing the second logical operation based on the random number and the image data, generates the third encoded data by inverting the (K+1)-th bit of the second encoded data when a K-th bit of the first encoded data is generated by the first logical operation and the (K+1)-th bit of the second encoded data is a same as a value generated by performing the second logical operation based on the random number and the image data, and generates the third encoded data by inverting the (K+1)-th bit of the second encoded data when the K-th bit of the first encoded data is generated by the second logical operation and the (K+1)-th bit of the second encoded data is a same as a value generated by performing the first logical operation based on the random number and the image data.

10. The data transceiver system of claim 8, wherein the encoder includes:
    a second inverter which inverts the second encoded data;
    a first selector which determines whether the logical operation is converted and output a first conversion selection signal; and
    a third multiplexer including a first input terminal connected to the second inverter, a second input terminal which receives the second encoded data, a control terminal which receives the first conversion selection signal, and an output terminal which outputs the third encoded data.

11. The data transceiver system of claim 8, wherein the encoder generates fourth encoded data by inverting a (K+1)-th bit, where K is a multiple of N, of the third encoded data when the third encoded data has a same value from a (K-N+1)-th bit to a K-th bit, and
    wherein the decoder restores the third encoded data by decoding the fourth encoded data.

12. The data transceiver system of claim 11, wherein the encoder includes:
    a third inverter which inverts the third encoded data;
    a first continuous selection signal generator which determines whether the third encoded data has a same value from the (K-N+1)-th bit to the K-th bit and outputs a first continuous selection signal; and
    a fourth multiplexer including a first input terminal connected to the third inverter, a second input terminal which receives the third encoded data, a control terminal which receives the first continuous selection signal, and an output terminal which outputs the fourth encoded data.

13. A display system comprising:
    a host processor including a encoder which generates first encoded data by performing a logical operation based on a random number and image data, and generates second encoded data by inverting the first encoded data every N bits, where N is a positive integer greater than or equal to 2; and
    a display device including:
      a decoder which restores the first encoded data by decoding the second encoded data, and restores the image data by decoding the first encoded data,
    wherein
    the decoder displays an image based on the image data, and wherein the encoder generates the first encoded data by selectively performing a first logical operation or a second logical operation different from the first logical operation.

14. The display system of claim 13, wherein the encoder generates third encoded data by inverting the second encoded data when the performed logical operation is converted, and wherein the decoder restores the second encoded data by decoding the third encoded data.

15. The display system of claim 14, wherein the encoder generates fourth encoded data by inverting a (K+1)-th bit, where K is a multiple of N, of the third encoded data when the third encoded data has a same value from a (K−N+1)-th bit to a K-th bit, and wherein the decoder restores the third encoded data by decoding the fourth encoded data.

16. A display device comprising:
a display panel including pixels;
a driving controller including an encoder which generates first encoded data by performing a logical operation based on a random number and image data, and generates second encoded data by inverting the first encoded data every N bits, where N is a positive integer greater than or equal to 2; and a data driver including a decoder which restores the first encoded data by decoding the second encoded data, and restores the image data by decoding the first encoded data, and which provides data voltages to the pixels, wherein the encoder generates the first encoded data by selectively performing a first logical operation or a second logical operation different from the first logical operation.

17. The display device of claim 16, wherein the encoder generates third encoded data by inverting the second encoded data when the performed logical operation is converted, and wherein the decoder restores the second encoded data by decoding the third encoded data.

18. The display device of claim 17, wherein the encoder generates fourth encoded data by inverting a (K+1)-th bit, where K is a multiple of N, of the third encoded data when the third encoded data has a same value from a (K−N+1)-th bit to a K-th bit, and wherein the decoder restores the third encoded data by decoding the fourth encoded data.

19. The display device of claim 18, wherein the encoder outputs a clock training signal when an active period starts, and outputs the fourth encoded data in the active period, and does not output the fourth encoded data in a blank period.

* * * * *